(12) United States Patent
Lee et al.

(10) Patent No.: US 10,996,847 B2
(45) Date of Patent: *May 4, 2021

(54) METHOD FOR PROVIDING CONTENT SEARCH INTERFACE AND ELECTRONIC DEVICE FOR SUPPORTING THE SAME

(71) Applicant: Samsung Electronics Co., Ltd., Gyeonggi-do (KR)

(72) Inventors: Gi Yong Lee, Gyeonggi-do (KR); Min Kyu Park, Seoul (KR); Ji Won Jeon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/786,492

(22) Filed: Feb. 10, 2020

(65) Prior Publication Data
US 2020/0183575 A1    Jun. 11, 2020

Related U.S. Application Data

(63) Continuation of application No. 15/240,631, filed on Aug. 18, 2016, now Pat. No. 10,558,354.

(30) Foreign Application Priority Data

Aug. 18, 2015    (KR) .................. 10-2015-0116325

(51) Int. Cl.
*G06F 3/0488*    (2013.01)
*G06F 3/0484*    (2013.01)
(Continued)

(52) U.S. Cl.
CPC ........ *G06F 3/04883* (2013.01); *G06F 3/0488* (2013.01); *G06F 3/04845* (2013.01);
(Continued)

(58) Field of Classification Search
CPC . G06F 3/04883; H04N 5/44513; G11B 27/34; G11B 27/102
See application file for complete search history.

(56) References Cited

U.S. PATENT DOCUMENTS 5,237,648 A * 8/1993 Mills .................... G11B 27/028
345/474
7,844,901 B1    11/2010 Joseph
(Continued)

FOREIGN PATENT DOCUMENTS

KR    10-2009-0096713    9/2009
KR    10-2013-0085703    7/2013

*Primary Examiner* — Andrew L Tank
(74) *Attorney, Agent, or Firm* — The Farrell Law Firm, P.C.

(57) ABSTRACT

Method for providing content search interface in electronic device including executing content on screen; displaying first graphic user interface (GUI) including a first object indicating starting point of content, second object indicating ending point of content, and third object indicating point of playback of content, wherein first object and second object are near each other and third object is displayed on curved path connecting first object and second object; in response to receiving first user input on first GUI, moving third object on curved path; in response to receiving second user input, displaying second GUI forming angle within selected range on curved path, wherein second GUI comprises plurality of discrete labels representing different speeds or rates at which third object moves on curved path; and in response to receiving third gesture input on second GUI while content is executed, changing speed at which third object moves on curved path.

20 Claims, 15 Drawing Sheets

(51) Int. Cl.
*G06F 16/43* (2019.01)
*G11B 27/34* (2006.01)
*G11B 27/10* (2006.01)

(52) U.S. Cl.
CPC .......... *G06F 3/04847* (2013.01); *G06F 16/43* (2019.01); *G11B 27/102* (2013.01); *G11B 27/34* (2013.01)

(56) References Cited

U.S. PATENT DOCUMENTS

| | | |
|---|---|---|
| 7,956,847 B2 | 6/2011 | Christie |
| 8,422,643 B2 * | 4/2013 | Ratzlaff .............. H04M 1/6505 379/88.13 |
| 8,689,128 B2 | 4/2014 | Chaudhri |
| 2007/0136679 A1 | 6/2007 | Yang |
| 2008/0168501 A1 | 7/2008 | Migos et al. |
| 2009/0051660 A1 | 2/2009 | Feland, III |
| 2011/0157046 A1 | 6/2011 | Lee |
| 2012/0079386 A1 | 3/2012 | Kim |
| 2013/0067332 A1 | 3/2013 | Greenwood et al. |
| 2013/0191747 A1 | 7/2013 | Choi |
| 2014/0258854 A1 | 9/2014 | Li |
| 2014/0310598 A1 | 10/2014 | Sprague |
| 2015/0205511 A1 | 7/2015 | Vinna |
| 2016/0267945 A1 | 9/2016 | Daishaku |

\* cited by examiner

_US 10,996,847 B2_

METHOD FOR PROVIDING CONTENT SEARCH INTERFACE AND ELECTRONIC DEVICE FOR SUPPORTING THE SAME

PRIORITY

This continuation application claims priority under 35 U.S.C. § 120 to U.S. patent application Ser. No. 15/240,631, which was filed in the U.S. Patent and Trademark Office on Aug. 18, 2016, which claimed priority under 35 U.S.C. § 119(a) to Korean Patent Application Serial No. 10-2015-0116325, which was filed in the Korean Intellectual Property Office on Aug. 18, 2015, the entire disclosures of each of which are incorporated herein by reference.

BACKGROUND

1. Field of the Disclosure

The present disclosure relates generally to content searching, and more particularly to a method and apparatus for providing a looping graphic user interface (GUI) for content searching.

2. Description of the Related Art

An electronic device may perform a function of executing (or reproducing) a variety of content. The electronic device may also perform a function of searching through content, such that a user may select a specific location in the content and may reproduce the content from the selected location. For example, the electronic device may provide a content search interface.

To search content, the electronic device often provides a linear search controller (e.g., a progress bar) configured to correspond to the entire playback length of content to be searched for. However, because the linear search controller corresponds to the entire playback length of the content to be searched for, a search movement interval (or a search unit) may be configured in a different way per content. Therefore, it may be difficult for a user to select a desired playback location by setting a search movement interval to be relatively broader, if the entire playback length of the content to be searched for is longer.

Also, the linear search controller may be configured such that a search function corresponds to a gesture input (e.g., a drag) of a linear direction. However, a movement range of the gesture input may be limited to a size of a region of receiving the gesture input. For example, a region of a touch screen that receives the gesture input may be a movement range of the gesture input. In this case, although the user inputs a gesture on an edge of the touch screen, the search controller may not search for content of a playback starting location or a playback ending location.

SUMMARY

The present disclosure is made to address at least the above-mentioned problems and/or disadvantages and to provide at least the advantages described below.

Accordingly, an aspect of the present disclosure is to provide a method and an electronic device for providing a content search interface.

In accordance with an aspect of the present disclosure, an electronic device is provided. The electronic device includes a touch screen display; a processor; and a memory configured to store audio/video data comprising a starting point and an ending point, and instructions, which, when executed, instruct the processor to play the audio/video data; display, on the touch screen display, a first GUI comprising a first object indicating the starting point, a second object indicating the ending point, and a third object indicating a point of playback, wherein the first object and the second object are near each other and the third object is displayed on a curved path connecting the first object and the second object; receive, through the touch screen display, a first gesture input on the first GUI; in response to receiving the first gesture input, move the third object on the curved path; receive, through the touch screen display, a second gesture input; in response to receiving the second gesture input, display a second GUI forming an angle within a selected range on the curved path, wherein the second GUI comprises a plurality of discrete labels representing different speeds or rates at which the third object moves on the curved path; receive, through the touch screen display, a third gesture input on the second GUI while the audio/video data is played; and in response to receiving the third gesture input, change a speed or rate at which the third object moves on the curved path.

In accordance with another aspect of the present disclosure, an electronic device is provided. The electronic device includes a touch screen display; a processor; and a memory configured to store content and instructions, which, when executed, instruct the processor to execute the content; display, on the touch screen display, a first GUI comprising a first object indicating a starting point of the content, a second object indicating an ending point of the content, and a third object indicating a point of playback of the content, wherein the first object and the second object are near each other and the third object is displayed on a curved path connecting the first object and the second object; receive, through the touch screen display, a first gesture input; in response to receiving the first gesture input, move the third object on the curved path; receive, through the touch screen display, a second gesture input; in response to receiving the second gesture input, display a second GUI forming an angle within a selected range on the curved path, wherein the second GUI comprises a plurality of discrete labels representing different speeds or rates at which the third object moves on the curved path; receive, through the touch screen display, a third gesture input on the second GUI while the content is executed; and in response to receiving the third gesture input, change a search unit of the content.

In accordance with another aspect of the present disclosure, a method for providing a content search interface in an electronic device is provided. The method includes executing content on a screen; displaying a first GUI comprising a first object indicating a starting point of the content, a second object indicating an ending point of the content, and a third object indicating a point of playback of the content, wherein the first object and the second object are near each other and the third object is displayed on a curved path connecting the first object and the second object; in response to receiving a first user input on the first GUI, moving the third object on the curved path; in response to receiving a second user input, displaying a second GUI forming an angle within a selected range on the curved path, wherein the second GUI comprises a plurality of discrete labels representing different speeds or rates at which the third object moves on the curved path; and in response to receiving a third gesture input on the second GUI while the content is executed, changing a speed at which the third object moves on the curved path.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
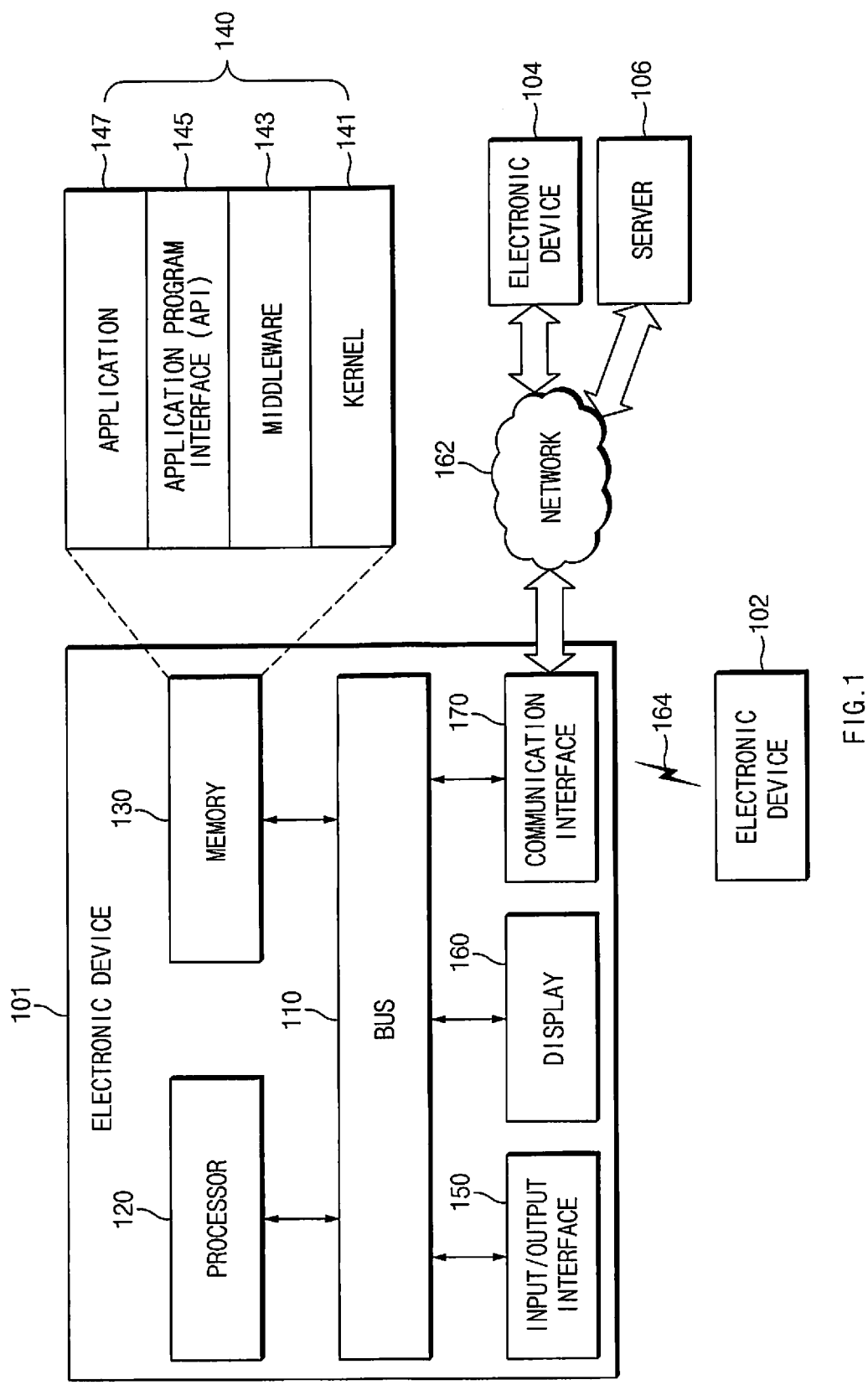
FIG. 1 illustrates an electronic device in a network environment according to an embodiment of the present disclosure.

Hereinafter, various embodiments of the present disclosure are disclosed with reference to the accompanying drawings. However, the present disclosure is not intended to be limited by these various embodiments, but is intended to cover all modifications, equivalents, and/or alternatives of the present disclosure that fall within the scope of the appended claims and their equivalents.

With respect to the descriptions of the accompanying drawings, like reference numerals refer to like elements, features, and structures.

The terms and words used in the following description and claims are not limited to their dictionary meanings, but are used to provide a clear and consistent understanding of the present disclosure. Accordingly, it should be apparent to those skilled in the art that the following description of various embodiments of the present disclosure is provided for illustration purposes only and not for the purpose of limiting the present disclosure.

Herein, singular forms such as "a," "an," and "the" include plural referents unless the context clearly dictates otherwise. Thus, for example, reference to "a component surface" includes reference to one or more of such surfaces.

The terms "include," "comprise," "have", "may include," "may comprise" and "may have" indicate disclosed functions, operations, or existence of elements, but do not exclude other functions, operations or elements.

Expressions such as "A or B" or "at least one of A and/or B" may indicate A and B, A, or B.

Terms such as "1st," "2nd," "first," "second," etc., may be used to distinguish various different elements, but are not intended to limit the elements. For instance, "a first user device" and "a second user device" may indicate different users regardless of order or importance. Similarly, "a first component" may be referred to as "a second component," and vice versa, without departing from the scope and spirit of the present disclosure.

When a component (e.g., a first component) is referred to as being "operatively or communicatively coupled with/to" or "connected to" another component (e.g., a second component), the first component may be directly connected to the second component or another component (e.g., a third component) may exist therebetween. However, when the first component is referred to as being "directly connected to" or "directly accessed by" the second component, no other component may exist therebetween.

The expression "configured to" may be interchangeably used with "suitable for," "having the capacity to," "designed to," "adapted to," "made to," or "capable of" according to context. The term "configured to" does not necessarily mean "specifically designed to" in terms of hardware. Instead, the expression "a device configured to" in some situations may indicate that the device and another device or part are "capable of." For example, the expression "a processor configured to perform A, B, and C" may indicate a dedicated processor (e.g., an embedded processor) for performing a corresponding operation or a general purpose processor (e.g., a central processing unit (CPU) or application processor (AP)) for performing corresponding operations by executing at least one software program stored in a memory device.

All terms used herein may have the same meanings that are generally understood by a person skilled in the art. In general, terms defined in a dictionary should be considered to have the same meanings as the contextual meaning of the related art. Unless clearly defined as such herein, terms should not be understood differently or as having excessively formal meanings. Even terms defined in the present disclosure are not intended to be interpreted as excluding embodiments of the present disclosure.

An electronic device may include a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may be an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

An electronic device may also be a home appliance, such as a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync®, Apple TV®, or Google TV®), a game console (e.g., Xbox® or PlayStation®), an electronic dictionary, an electronic key, a camcorder, or an electronic picture frame.

An electronic device may include at least one of various medical devices (e.g., various portable medical measurement devices such as a blood glucose measuring device, a heart rate measuring device, a blood pressure measuring device, a body temperature measuring device, etc., a magnetic resonance angiography (MRA), a magnetic resonance imaging (MRI), a computed tomography (CT), a scanner, an ultrasonic device, etc.), a navigation device, a global navigation satellite system (GNSS), an event data recorder (EDR), a flight data recorder (FDR), a vehicle infotainment device, electronic equipment for vessels (e.g., a navigation system, a gyrocompass, etc.), avionics, a security device, a head unit for a vehicle, an industrial or home robot, an automatic teller machine (ATM), a point of sales (POS) device of a store, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, etc.).

An electronic device may also be a part of furniture or a building/structure, an electronic board, an electronic signature receiving device, a projector, or a measuring instrument (e.g., a water meter, an electricity meter, a gas meter, a wave meter, etc.).

An electronic device may also be a flexible device.

An electronic device may also be a combination of any of the above-mentioned devices.

An electronic device according to an embodiment of the present disclosure is not limited to the above-mentioned devices, and may include new electronic devices with the development of new technology.

Herein, the term "user" may refer to a person who uses an electronic device or may refer to a device (e.g., an artificial intelligence electronic device) that uses an electronic device.

FIG. 1 illustrates an electronic device in a network environment according to an embodiment of the present disclosure.

Referring to FIG. 1, the electronic device 101 may connect with a first external electronic device 102, a second external electronic device 104, or a server 106 via a network 162 or a short-range communications 164. The electronic device 101 may execute (or reproduce) a variety of content which are preloaded into a memory 130 or are downloaded from the external electronic device. The electronic device 101 may execute the content stored in the memory 130 through a series of procedures. In connection with executing the content, the electronic device 101 may perform a function of searching for the content such that its user may select a specific location in the entire playback interval of the content and may reproduce (or play) the content from the selected location.

The electronic device 101 includes a bus 110, a processor 120, a memory 130, an input/output interface 150, a display 160, and a communication interface 170. At least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

The processor 120 may control the components in connection with executing the content. For example, the processor 120 may control the memory 130 to store and load the content, may control an input/output interface 150 to process a user input associated with executing the content, may control a display 160 to output a screen of executing the content, or may control a communication interface 170 to communicate the content.

The processor 120 may provide a content search interface that supports to search for the content. For example, the processor 120 may provide a content search controller in response to a content search request. The processor 120 may analyze a user input corresponding to the content search request and may analyze a target to be searched for (e.g., search target) corresponding to the analyzed user input. The processor 120 may generate a search controller as a result of analyzing the search target and may output the search controller to correspond to a location where the user input occurs.

The processor 120 may generate the search controller as a circle. For example, the processor 120 may arrange a starting point and an ending point of the search controller to be adjacent to each other and may constitute a path (e.g., a closed loop) formed between the starting point and the ending point to be the circle. As the search controller is provided as the circle, the user may search for the content without being limited to a size of the display 160 which outputs the search controller. For example, the user may search for the content by inputting a circular gesture in the form of the search controller.

Alternatively, the form of the search controller is not limited to the circle. For example, the search controller may have a variety of forms, such as an oval, a triangle, a quadrangle, etc., each of which has the starting point and the ending point which are adjacent to each other. In this regard, the starting point and the ending point of the search controller may correspond to a starting point and an ending point of the content.

The starting point and the ending point of the search controller may also correspond to a starting point and an ending point of at least one of intervals which are present between the starting point and the ending point of the content. For example, content may be classified into a plurality of playback intervals having a playback time, and a starting point and an ending point of each of the plurality of playback intervals may correspond to a starting point and an ending point of the search controller. After the user inputs a specified gesture on the search controller, if a point of playback of the search controller rotates one turn or more on the path, the processor 120 may search for at least one playback interval by the number of corresponding turns.

The processor 120 may set a search unit (or a search movement interval) of the search controller.

The processor 120 may output a search unit setting object for guiding the user to select a search unit of the content. For example, the processor 120 may include the search unit setting object in a specified region of the search controller. The search unit may be an amount moved when the content is searched for. For example, if the content is audio/video data, the search unit may be set to a time or frame and the like. Alternatively, if the content is a directory (or a folder), the search unit may be set to the number of files and the like.

If the content includes history information, the search unit may be set to a time and the like.

The processor 120 may specify the search unit based on settings of an operating system (OS) or settings of an application which executes corresponding content, and the like.

In connection with searching for the content, the processor 120 may perform search processing of the content in response to a user input received through the content search controller. For example, the processor 120 may change and output a point of playback of the content to correspond to a search location. The processor 120 may change and output an indicator indicating a point of playback of the content search controller to correspond to the search location. The point of playback of the content search controller may correspond to a point of playback of the content.

The memory 130 may include a volatile memory and/or a nonvolatile memory. The memory 130 may store instructions or data related to at least one of the other elements of the electronic device 101. The memory 130 stores software and/or a program 140. The program 140 includes a kernel 141, a middleware 143, an application is programming interface (API) 145, and an application program (or an application) 147. At least a portion of the kernel 141, the middleware 143, or the API 145 may be referred to as the OS.

The kernel 141 may control or manage system resources (e.g., the bus 110, the processor 120, the memory 130, etc.) used to perform operations or functions of other programs (e.g., the middleware 143, the API 145, or the application program 147). Further, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Further, the middleware 143 may handle one or more task requests received from the application program 147 according to a priority order. For example, the middleware 143 may assign at least one application program 147 a priority for using the system resources (e.g., the bus 110, the processor 120, the memory 130, etc.) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, etc.

An application 147 may include a media file playback application (e.g., an audio playback application or a video playback application, and the like), a file search application (e.g., a file explorer and the like), or a location search application (e.g., a map application and the like), and the like. In addition, the application 147 may include a location tracking application, an exercise management application, etc.

The memory 130 may store a variety of content, such as text, an image, an icon, a photo, an audio, a video, etc. The content may include a file configured with at least one content and may include a directory (or a folder) configured with information of at least one file.

The memory 130 may store instructions associated with executing the content. The instructions may include an instruction to store and load the content in the memory 130, an instruction to output a screen of executing the content, an instruction to process a user input associated with executing the content, an instruction to analyze a target to be searched for in response to the user, an instruction to generate a content search controller based on the analyzed result, an instruction to output the content search controller in response to the user input, or an instruction to perform search processing of the content in response to a user input received through the content search controller, etc.

The input/output interface 150 may transfer an instruction or data input from a user or another external device to other elements of the electronic device 101. Further, the input/output interface 150 may output instructions or data received from other elements of the electronic device 101 to the user or another external device.

The display 160 may include a liquid crystal display (LCD), a light-emitting diode (LED) display, an organic light-emitting diode (OLED) display, a microelectromechanical systems (MEMS) display, or an electronic paper display. The display 160 may present various content to the user. The display 160 may include a touch screen, and may receive a touch, gesture, proximity or hovering input from an electronic pen or a part of a body of the user.

The communication interface 170 may set communications between the electronic device 101 and a first external electronic device 102, a second external electronic device 104, and/or a server 106. For example, the communication interface 170 may be connected to a network 162 via wireless communication or wired communication in order to communicate with the second external electronic device 104 or the server 106.

The wireless communication may use a cellular communication protocol such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communication may include short-range communication 164. The short-range communication may include wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS device. The POS device may detect the magnetic signals by using a MST reader and restore data by converting the detected electromagnetic signals into electrical signals.

The GNSS may include a global positioning system (GPS), a global navigation satellite system (GLONASS), a Beidou navigation satellite system (Beidou), or Galileo, the European global satellite-based navigation system, according to a use area or a bandwidth. Herein, the terms "GPS" and "GNSS" may be interchangeably used.

The wired communication may use universal serial bus (USB), high definition multimedia interface (HDMI), recommended standard 832 (RS-232), plain old telephone service (POTS), etc.

The network 162 may include a telecommunications network, a computer network (e.g., local area network (LAN) or wide area network (WAN)), the Internet, or a telephone network.

The types of the first external electronic device 102 and the second external electronic device 104 may be the same as or different from the type of the electronic device 101.

The server 106 may include a group of one or more servers. A portion or all of operations performed in the electronic device 101 may be performed in one or more of the first electronic device 102, the second external electronic device 104, or the server 106. When the electronic device 101 should perform a certain function or service automatically or in response to a request, the electronic device 101 may request at least a portion of functions related to the function or service from the first electronic device 102, the second external electronic device 104, or the server 106, instead of or in addition to performing the function or service for itself. The first electronic device 102, the second external electronic device 104, or the server 106 may perform the requested function or additional function, and may transfer a result of the performance to the electronic device 101. The electronic device 101 may use a received result itself or additionally process the received result to provide the requested function or service; For example, a cloud computing technology, a distributed computing technology, or a client-server computing technology may be used.

Figure 2:
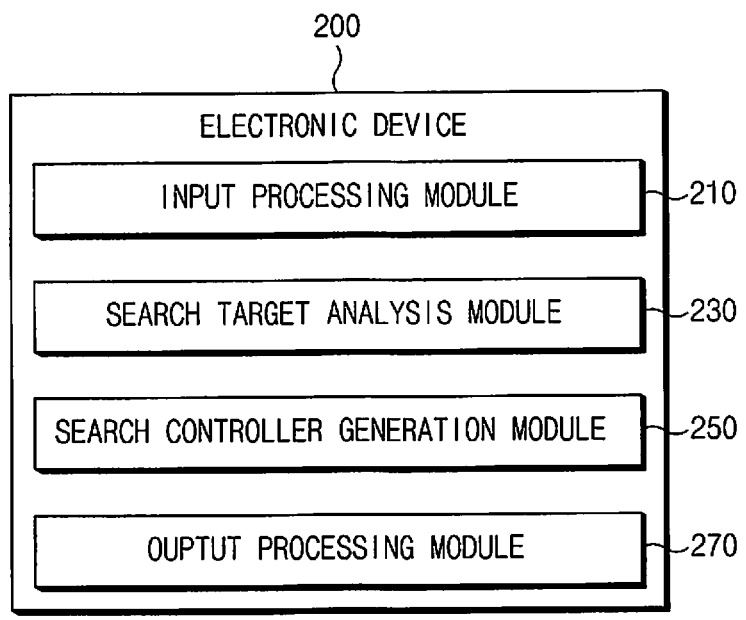
FIG. 2 illustrates an electronic device associated with providing a content search interface according to an embodiment of the present disclosure.

FIG. 2 illustrates an electronic device for providing a content search interface according to an embodiment of the present disclosure.

Referring to FIG. 2, the electronic device 200 includes an input processing module 210, a search target analysis module 230, a search controller generation module 250, and an output processing module 270. FIG. 2 schematically illustrates only the components of the electronic device 200, associated with a function of searching for content. Other components may be further included in the electronic device 200. For example, the electronic device 200 of the FIG. 2 may have the same or similar configuration as the electronic device 101 of FIG. 1. As such, at least one of the input processing module 210, the search target analysis module 230, the search controller generation module 250, or the output processing module 270 may correspond to at least one function of the processor 120 illustrated in FIG. 1.

The input processing module 210 may process a user input associated with executing content. If receiving an input for selecting specific content of at least one content stored in the electronic device 200, the input processing module 210 may provide an execution environment to execute the content. For example, if an application for executing content is not currently being executed, the input processing module 210 may execute the application and may send information associated with the content to the application. Alternatively, if the application is being executed, the input processing module 210 may send the information associated with the content to the application.

The input processing module 210 may process a user input associated with searching for the content, which occurs when the content is being executed by the application. The input processing module 210 may analyze the user input and may send the analyzed result to the search target analysis module 230. For example, the input processing module 210 may analyze a type, a form, a location, an occurrence time, or duration, and the like of the user input and may send the analyzed result to the search target analysis module 230.

The search target analysis module 230 may analyze a target to be searched, for example, the content. The search target analysis module 230 may analyze a type of the content and may verify a search unit set in response to the content. For example, the search target analysis module 230 may determine whether the content is a file including text, an image, an icon, a photo, an audio, or a video, etc., or whether the content is a directory. If the content is the directory, the search target analysis module 230 may set a search unit to the number of files to search for files included in the directory.

The search target analysis module 230 may verify a set search unit and may designate the search unit as the number of files, if there is no set value.

If the content is the file, the search target analysis module 230 may set the search unit in a different way based on a type of the content. For example, if the content is a media file, the search target analysis module 230 may set the search unit to the number of frames or a time. Alternatively, if the content is a file including history information, the search target analysis module 230 may set the search unit to a time.

Similarly, although the content is a file, the search target analysis module 230 may first verify a set search unit and may set the search unit to corresponding information only if there is no set value.

The search target analysis module 230 may set the search unit in a different way based on a result of analyzing the user input, received from the input processing module 210. The search target analysis module 230 may set the search unit to the number of frames, a playback volume level, or a screen brightness level, etc., based on an occurrence location of a user input in response to the user input which occurs during execution of a media file. The search target analysis module 230 may send the set search unit to the search controller generation module 250.

The search controller generation module 250 may generate a search controller for content. For example, the search controller generation module 250 may generate a search controller which may set a point of playback of the content in response to a user input associated with searching for the content.

The search controller generation module 250 may generate a search controller which is substantially a circle.

The search controller generation module 250 may generate a search unit setting object for guiding the user to change or set a search unit and may include the generated search unit setting object in the search controller. The search controller generation module 250 may generate the search unit setting object based on the search unit received from the search target analysis module 230. If receiving a user input on the search unit setting object, the input processing module 210 may analyze the user input and may change the search unit based on the analyzed result.

The output processing module 270 may perform output processing of the content. For example, the output processing module 270 may control to output a screen of executing the content. The screen for executing the content may be a screen of executing a function of the application which may execute the content. Also, if the content includes audio data, the output processing module 270 may control an audio output device to output the content.

The output processing module 270 may output the content search controller. The output processing module 270 may output the search controller in response to an occurrence location of a user input associated with searching for the content. Also, the output processing module 270 may change the content and the search controller in response to a change of a point of playback based on a function of searching for the content and may output the changed content and the changed search controller.

According to various embodiments, an electronic device may include a touch screen display, a processor configured to electrically connect with the touch screen display, and a memory configured to electrically connect with the processor. The memory may be configured to store at least part of audio/video data including a starting point and an ending point. And the memory may store instructions for, when executed, causing the processor to sequentially or continuously reproduce the at least stored part of the audio/video data, display a graphic user interface (GUI) indicating the starting point, the ending point, and a point of playback on the touch screen display, the starting point and the ending point being overlapped and adjacent to each other and the point of playback being displayed on a path formed between the starting point and the ending point, receive a first gesture input through the touch screen display, and move the point of playback on the path based on at least part of the first gesture input.

According to various embodiments, the path may be substantially a circle.

According to various embodiments, the starting point, the ending point, and the path may form a closed loop.

According to various embodiments, the first gesture input may have the same or similar form to at least part of the path.

According to various embodiments, the instructions may cause the processor to receive a second gesture input of forming an angle within a selected range with the path, through the touch screen display, and change a speed or rate at which the point of playback moves on the path based on the first gesture input, based on at least part of the second gesture input.

According to various embodiments, the GUI may be configured to display a relative time, in which the audio/video data is reproduced from the starting point to the point of playback, with respect to the entire playback time of the audio/video data along the path.

According to various embodiments, an electronic device may include a touch screen display, a processor configured to electrically connect with the touch screen display, and a memory configured to electrically connect with the processor. The memory may be configured to store a plurality of images, each of which includes a staring image, an ending image, and middle images in which an order to be displayed between the starting image and the ending image is determined. The memory may store instructions for, when executed, causing the processor to sequentially display at least some of the plurality of stored images on the touch screen display, to display a graphic user interface (GUI) indicating a starting point corresponding to the starting image, an ending point corresponding to the ending image, and a display point corresponding to each of the middle images on the touch screen display, the starting point and the ending point being overlapped and adjacent to each other and the display point being displayed on a path formed between the starting point and the ending point, to receive a first gesture input through the touch screen display, and to scroll the plurality of images based on the first gesture input and at least part of the order to be displayed.

According to various embodiments, an order to be displayed among the starting image, the ending image, and the middle images may be determined based on log data associated with the plurality of images.

According to various embodiments, an electronic device may include a touch screen display, a processor configured to electrically connect with the touch screen display, and a memory configured to electrically connect with the processor. The memory may store at least one content. And the memory may store instructions for, when executed, causing the processor to execute the content, display a graphic user interface (GUI) indicating a starting point of the content, an ending point of the content, and a point of playback of the content on the touch screen display, the starting point and the ending point being overlapped and adjacent to each other and the point of playback being displayed on a path formed between the starting point and the ending point, receive a first gesture input through the touch screen display, and move the point of playback on the path based on at least part of the first gesture input.

According to various embodiments, the path may be substantially a circle.

According to various embodiments, the starting point, the ending point, and the path may form a closed loop.

According to various embodiments, the first gesture input may have the same or similar form to at least part of the path.

According to various embodiments, the instructions may cause the processor to receive a second gesture input of forming an angle within a selected range with the path, through the touch screen display, and change a search unit of the content based on the first gesture input, based on at least part of the second gesture input.

According to various embodiments, the instructions may cause the processor to sequentially execute the content to have a search interval based on the search unit of the content.

According to various embodiments, the content may be a file including at least one of text, an image, an icon, a photo, an audio, or a video. According to various embodiments, the content may be a directory including at least one file.

Figure 3:
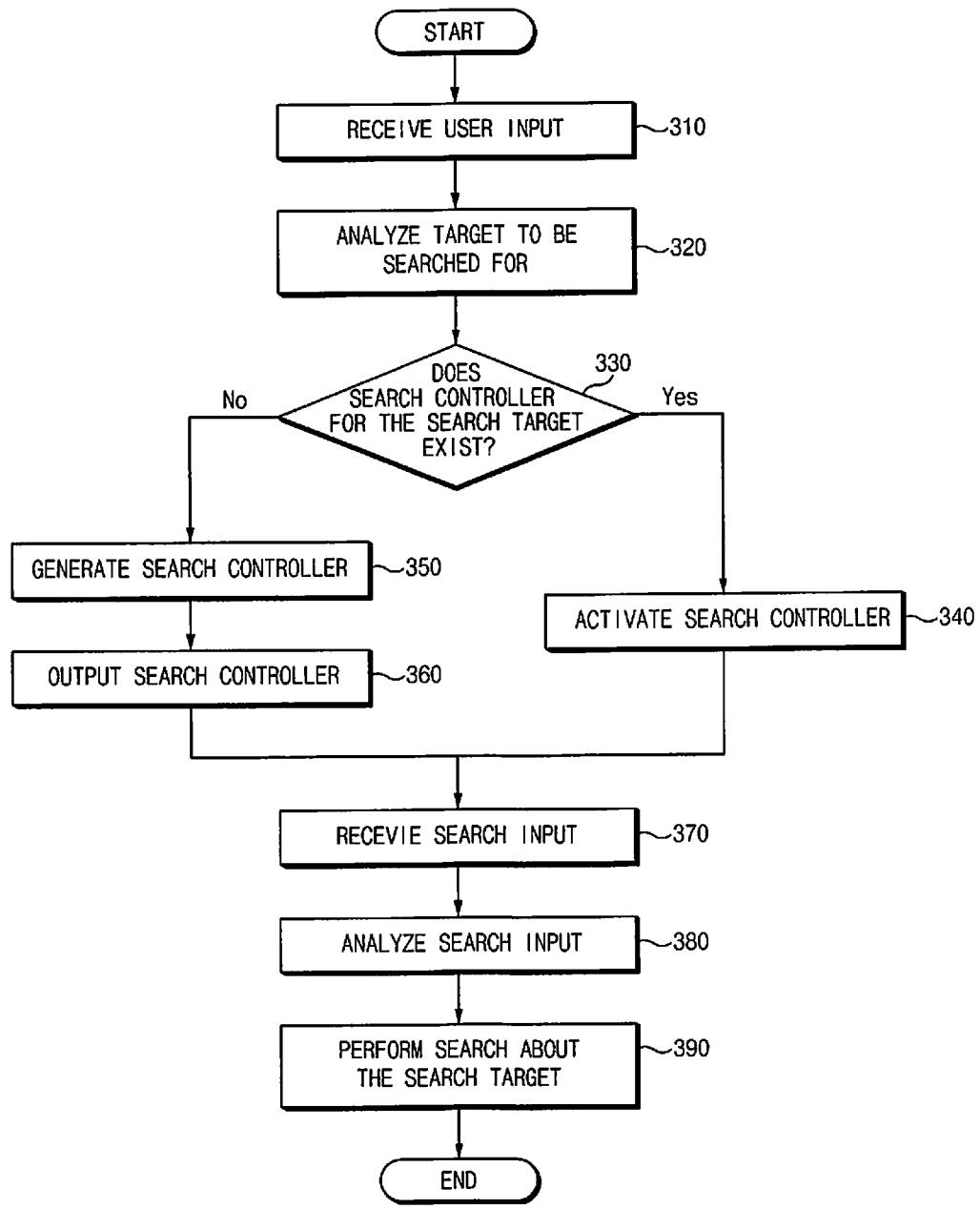
FIG. 3 is a flowchart illustrating a method of an electronic device for providing a content search function according to an embodiment of the present disclosure.

FIG. 3 is a flowchart illustrating a method of an electronic device for a content search function according to an embodiment of the present disclosure.

Referring to FIG. 3, in step 310, an electronic device receives a user input associated with a content search function. For example, the electronic device may receive a specified user input (e.g., a gesture input) that occurs when a screen executing content is output. The electronic device may analyze the user input. For example, the electronic device may analyze a type, a form, a location, an occurrence time, or duration, and the like of the user input.

In step 320, the electronic device analyzes a target to be searched. The electronic device may analyze a type of the content, which is the target to be searched for. For example, the electronic device may analyze whether the content, which is the search target, is a file including text, an image, an icon, a photo, an audio, or a video, and the like or whether the content is a directory. The electronic device may verify a search unit set in response to the object to be searched for. For example, the electronic device may verify a search unit of the search target, set by a platform, an application which executes the search target, or its user. The set search unit may be stored in a memory. The electronic device may set the search unit based on the result of analyzing the user input.

In step 330, the electronic device determines whether there is a search controller for the target. If the search controller for the search target is generated, the electronic device may not remove the search controller, except if execution of the search target is ended or if the electronic device is powered off. The electronic device may not delete an instance assigned when the search controller is generated to store the instance. The instance is an identifier of the search controller. Therefore, the electronic device may determine whether the instance exists to determine whether the search controller exists.

If the search controller exists in step 330, the electronic device activates the search controller in step 340. However, if there is no search controller in step 330, the electronic device generates the search controller in step 350. The electronic device may arrange a starting point and an ending point of the search controller to be overlapped or adjacent to each other, such that a path formed between the starting point and the ending point forms a loop, e.g., a circle, an oval, a square, etc. Also, the electronic device may generate a search unit setting object for guiding the user to set or change the search unit and may include the generated search unit setting object in the search controller.

The electronic device may generate the search unit setting object and may omit the generated search unit setting object from the search controller. Alternatively, the electronic device may generate the search unit setting object, may include the generated search unit setting object in the search controller, and may deactivate the search unit setting object or may process the search unit setting object to be transparent.

In step 360, the electronic device outputs the generated search controller. The electronic device may output the search controller to correspond to an occurrence location of the user input. For example, the electronic device may output the search controller by using the occurrence location of the user input as a central point of the search controller. The electronic device may change an output location of the search controller immediately before activating the search controller in step 340 or at intervals of a time to correspond to the occurrence location of the user input.

In step 370, the electronic device receives a search input. For example, the electronic device may receive a user input on the output search controller. The search input may have the same or similar form to the search controller. For example, if the search controller is a circle, the search input may be a circular gesture input. However, a type or form of the search input is not limited thereto. For example, the search input may be a voice input or may be a tap input for touching a point of the search controller.

In step 380, the electronic device analyzes the search input. For example, the electronic device may analyze a type, a form, a location, an occurrence time, duration, etc., of the search input. The electronic device may analyze a type or form of the search input. If the search input is a tap input, the electronic device may extract a location (occurrence location) of the search input. Alternatively, if the search input is a circular gesture input, the electronic device may analyze an occurrence location, a movement path, or a movement angle of the search input.

In step 390, the electronic device searches the search target, based on the result of analyzing the search input. If the search input is a tap input, the electronic device may change and output an indicator indicating a point of playback of the search controller to correspond to the extracted location of the search input. Also, the electronic device may change and output a point of playback of the search target to correspond to a point of playback of the search controller. If the search input is a circular gesture input, the electronic device may determine a point of playback of the search controller using a movement path or a movement angle, and the like relative to the extracted occurrence location of the search input. Therefore, the electronic device may change and output a point of playback of the search controller, thus changing and outputting a point of playback of the search target.

Figure 4:
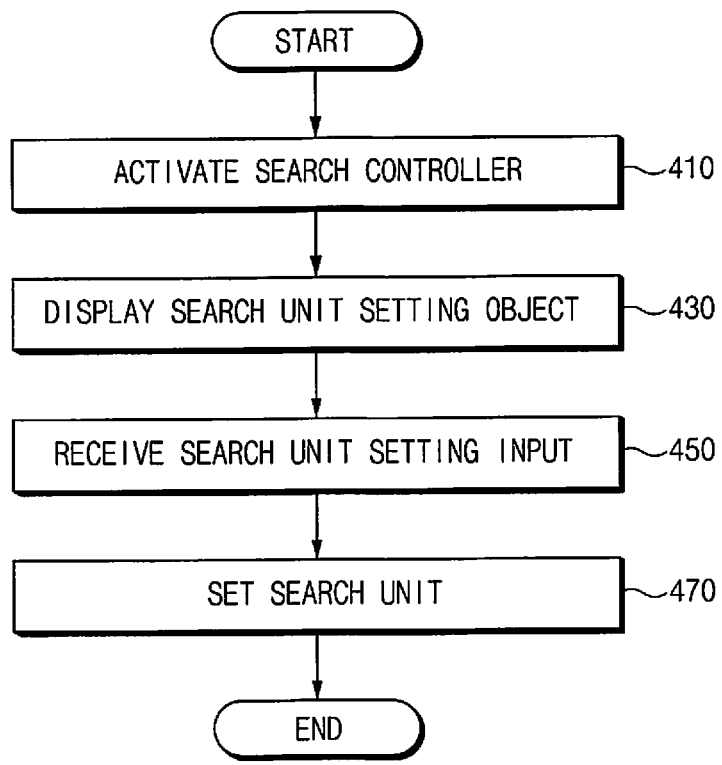
FIG. 4 is a flowchart illustrating a method of an electronic device for setting a search unit according to an embodiment of the present disclosure.

FIG. 4 is a flowchart illustrating a method of an electronic device for setting a search unit according to an embodiment of the present disclosure. For example, an electronic device may set a search unit of a search controller in response to a search unit setting input received when the search controller for content is output.

Referring to FIG. 4, in step 410, the electronic device activates the search controller for the content. If there is no search controller for the content, the electronic device may generate and output the search controller. If activating or outputting the search controller, the electronic device may not output a search unit setting object included in the search controller. Alternatively, the electronic device may deactivate the search unit setting object or may process the search unit setting unit to be transparent. The electronic device may fix the search unit setting object to a specified region of the search controller to output the search unit setting object.

If receiving a specified user input while the search controller is output, the electronic device displays the search unit setting object in step 430. Alternatively, the electronic device may activate the search unit setting object which is in a deactivated state.

In step 450, the electronic device receives a user input on the search unit setting object. The user input may be an input for setting the search unit.

In step 470, the electronic device sets the search unit in response to the received search unit setting object. The electronic device may store the search unit in its memory. When a search controller for a target to be searched is regenerated, after the search controller is removed, the electronic device may refer to the stored search unit.

After a user input, which occurs before step 430, for example, a user input specified to display the search unit setting object occurs continuously for a specified time or more, if a time elapses for the specified time, the electronic device may determine the user input as a user input for setting the search unit. For example, the electronic device may display the search unit setting object in response to a user input which occurs continuously for a specified time or more in a state where the search controller is output and may set the search unit.

The electronic device may include a separate display object for setting the search unit in a menu screen and the like.

Figure 5A:
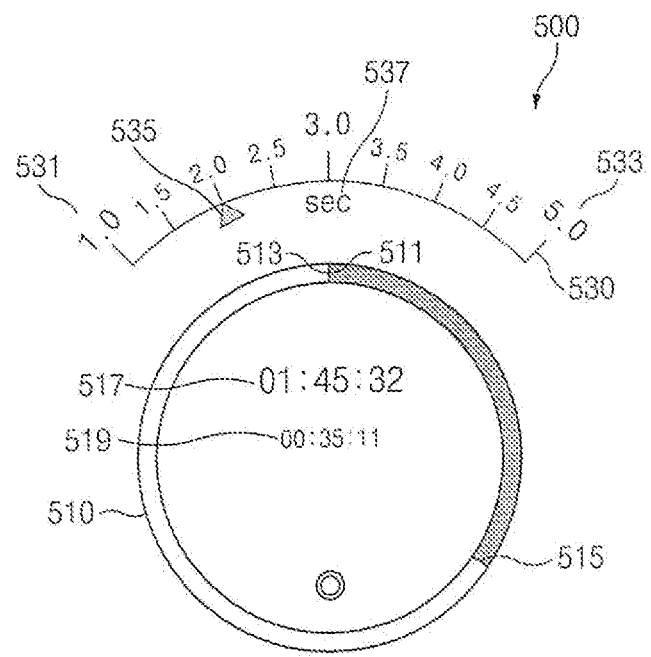
FIG. 5A illustrates a content search controller according to an embodiment of the present disclosure.

FIG. 5A illustrates a content search controller according to an embodiment of the present disclosure.

Referring to FIG. 5A, a search controller 500 is generated as a circle. However, the form of the search controller 500 is not limited thereto. For example, a search controller may be a square, an oval, a rectangle, an octagon, etc.

A starting point 511 and an ending point 513 of the search controller 500 are adjacent to each other and a path is formed between the starting point 511 and the ending point 513, which may include various forms such as a circle, an oval, and a quadrangle. The starting point 511 and the ending point 513 may be arranged to be overlapped or adjacent to each other.

The search controller 500 includes a search location selection object 510 and a search unit setting object 530. The search location selection object 510 includes the starting point 511, the ending point 513, a point 515 of playback, search target related information 517, and search unit related information 519.

The starting point 511, the ending point 513, and the point 515 of playback may correspond to a starting point, an ending point, and a point of playback of the content, respectively. Also, the starting point 511 and the ending point 513 may correspond to a starting point and an ending point of a playback interval, which is present between the starting point and the ending point of the content, respectively. A region or a line indicating a path from the starting point 511 to the point 515 of playback may be configured to vary in width, color, or thickness to be compared with the rest of the path.

The search target related information 517 may be an object for displaying information associated with a target to be searched for and may include a name (e.g., a file name, a folder name, or a setting name, etc.) of the search target or the entire playback time of the search target, etc. The search unit related information 519 may include information associated with a set search unit, a current playback time of the search target, or information associated with a currently executing file of the search target, etc.

The search unit setting object 530 includes a setting minimum value 531 of the search unit, a setting maximum value 533 of the search unit, a setting value indicator 535, and a setting unit display object 537. The setting minimum value 531 and the setting maximum value 533 may represent a range of setting the search unit. The setting minimum value 531 and the setting maximum value 533 may be set in a different way based on a type of the content and may be changed by a user input. The setting value indicator 535 may be a display object indicating a set value of the search unit and may indicate a currently set value among values displayed on a path formed between the setting minimum value and the setting maximum value 533.

Although the setting value indicator 535 is represented as a triangular image in FIG. 5A, the present disclosure is not limited thereto. For example, the setting value indicator 535 may be configured in various forms such as an arrow image and a line.

The setting unit display object 537 may represent a type of a setting unit. For example, the setting unit display object 537 may include text or an image indicating a frame, a time, the number of files, a scale, etc.

The search unit setting object 530 may be arranged to be adjacent to the search location selection object 510. The search unit setting object 530 may be arranged on an upper region outside the search location selection object 510.

Figure 5B:
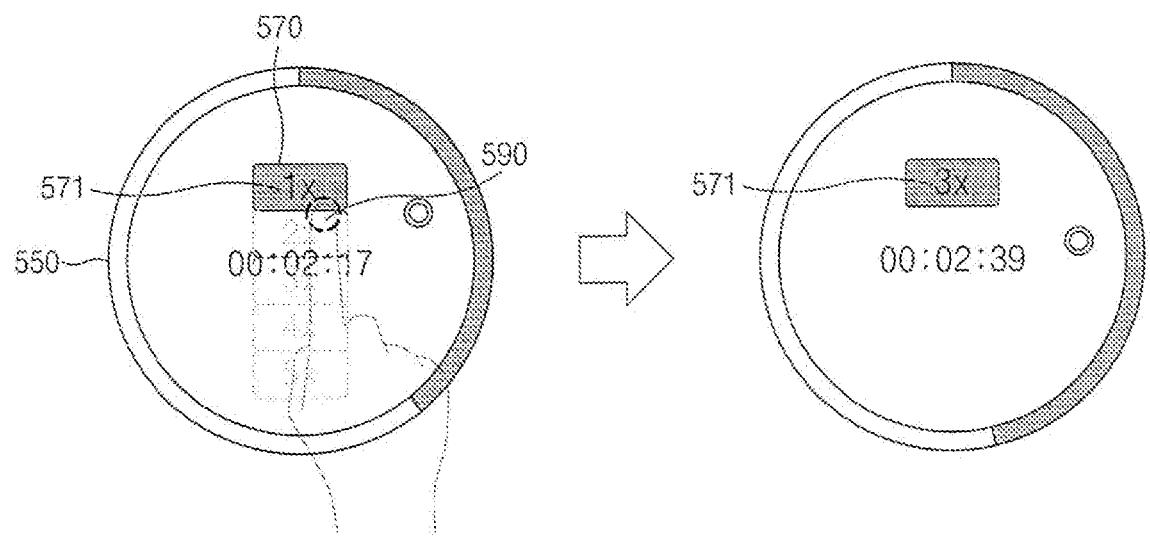
FIG. 5B illustrates a content search controller according to an embodiment of the present disclosure.

FIG. 5B illustrates a content search controller according to another embodiment of the present disclosure.

Referring to FIG. 5B, a search unit setting object 570 is arranged in a search location selection object 550. As illustrated in FIG. 5A, the search unit setting object 530 may have the same or similar shape to at least part of the search location selection object 510. For example, if the search location selection object 510 is configured as a circle, the search unit setting object 530 may be configured as a circular arc shape and may be arranged on the upper region outside the search location selection object 510. However, the form and components of the search unit setting object 530 are not limited thereto. For example, as illustrated in FIG. 5B, the search unit setting object 570 is configured as a rectangular box object. The box object may display only a current setting value 571 of the search unit before an input 590 for selecting the box object occurs.

After the input 590 occurs, as illustrated in FIG. 5B, the box object may be displayed as being unfolded by increasing a height or width of the box object to a size and may sequentially represent values, having an interval, from the setting minimum value 531 to the setting maximum value 533. Also, in the search unit setting object 570, the current setting value 571 of the search unit may be changed by an input for selecting a specific setting value included in the box object in the state where the box object is unfolded. FIG. 5B illustrates the current setting value 571 being changed from a first setting value (e.g., one time speed ("1×")) to a second setting value (e.g., three times speed ("3×")).

Figure 6:
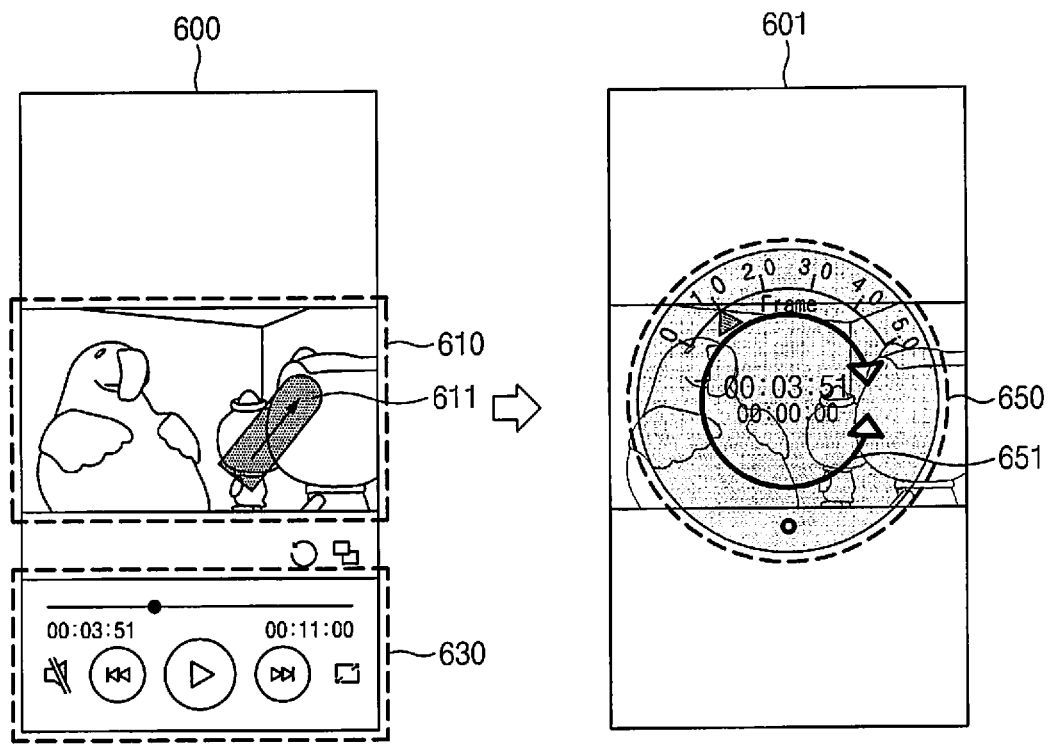
FIG. 6 illustrates screens for providing a content search interface of a media file playback application according to an embodiment of the present disclosure.

FIG. 6 illustrates screens for providing a content search interface of a media file playback application according to an embodiment of the present disclosure.

Referring to FIG. 6, an electronic device outputs a screen 600 executing a media file playback application. For example, if receiving a request to execute an audio file or a video file, the electronic device may execute a media file playback application which may execute the audio file or the video file, and the like.

The screen 600 of executing the media file playback application includes a media playback region 610 and a control object display region 630. The media playback region 610 is where a selected media file is reproduced and may be configured on a partial region or the entire region of the screen 600. The control object display region 630 includes a play button of the media file, a pause button of the media file, a stop button of the media file, a playback location display progress bar, a volume level setting button, a previous media file play button, a subsequent media file play button, etc. The media playback region 610 and the control object display region 630 may be configured such that at least part of the media playback region 610 and the control object display region 630 are overlapped with each other. At least part of the control object display object 630 may be displayed on the media playback region 610. Display objects included in at least one of the media playback region 610 or the control object display region 630, corresponding to the overlapped region, may be output to have different transparency.

If a specified user input 611 occurs on the media playback region 610, the electronic device may provide a search interface for the media file. For example, the electronic device may output a search controller 650 of the media file on a region of a screen 601. The electronic device may specify an output location of the search controller 650 based on an occurrence location of the user input 611. For example, if the user input 611 is a gesture input of touching a point of the media playback region 610 and then moving to a specified distance or more in a direction, the electronic device may output the search controller 650 in a circle with a diameter which is a line of connecting the point of the media playback region 610 with a point where the gesture input is ended.

After receiving a user input 651 on the search controller 650, the electronic device may analyze the user input 651 and may search for the media file based on the analyzed result. The electronic device may analyze a type, a form, a location, an occurrence time, or duration of the user input 651 and may calculate a search location for the media file based on the analyzed result. For example, if the user input 651 is a tap input, the electronic device may extract a tap location, may designate the tap location as a search location, and may search for the media file. Also, if the user input 651 is a circular gesture input, the electronic device may analyze an occurrence location, a movement path, or a movement angle, and the like of the circular gesture input, may specify a search location, and may search for the media file.

Figure 7:
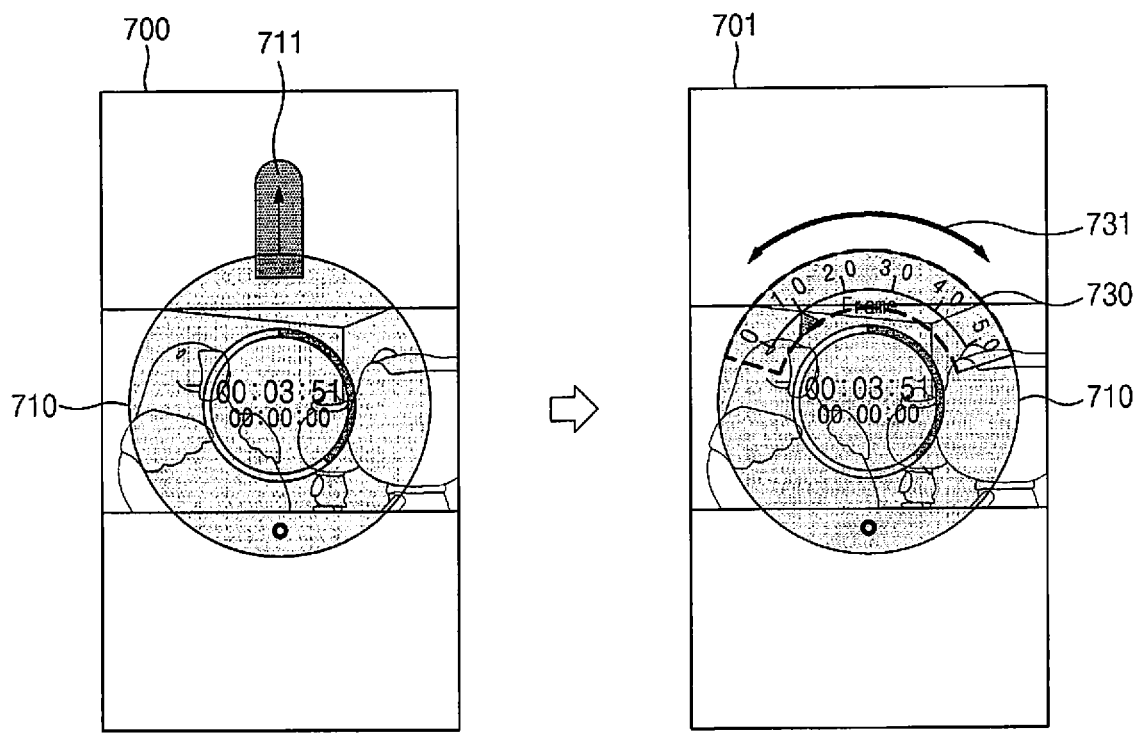
FIG. 7 illustrates screens of setting a search unit according to an embodiment of the present disclosure.

FIG. 7 illustrates screens for setting a search unit according to an embodiment of the present disclosure.

Referring to FIG. 7, an electronic device outputs a content execution screen 700 in response to a content execution request. When a specified user input occurs on a region of the content execution screen 700, the electronic device outputs a content search controller 710. The electronic device may not output a search unit setting object 730, may deactivate the search unit setting object 730, or may process the search unit setting to object 730 to be transparent, when outputting the content search controller 710. In this case, if a specified user input 711 occurs on a specified region of the content search controller 710, the electronic device may output the search unit setting object 730, may activate the search unit setting object 730, or may process the search unit setting object 730 to be non-transparent.

When the search unit setting object 730 is output in a screen 701, if a user input 731 on the search unit setting object 730 occurs, the electronic device may set a search unit. For example, the electronic device may analyze the user input 731 and may specify a setting value based on an occurrence location of the user input 731. The electronic device may change and output a setting value indicator on a path of the search unit setting object 730 to correspond to the setting value.

When outputting the content search controller 710, the electronic device may include the search unit setting object 730 in the content search controller 710. If the specified user input 711 occurs on the specified region of the content search controller 710, the electronic device may change an output location of the search unit setting object 730 to an occurrence location of the user input 711. Alternatively, if the search unit setting object 730 is output in the form of not displaying a setting minimum value and a setting maximum value, the electronic device may expand a height or width of the search unit setting object 730 in response to the user input 711 and may sequentially display values, having an interval, from the setting minimum value to the setting maximum value.

Each of the setting minimum value, the setting maximum value, and the setting value may be designated as an absolute numeric value of the search unit. For example, if the content is a media file, the each of the setting minimum value, the setting maximum value, and the setting value may be designated as the specified number of frames (e.g., one frame to five frames) or a specified time (e.g., one second to five seconds).

Figure 8:
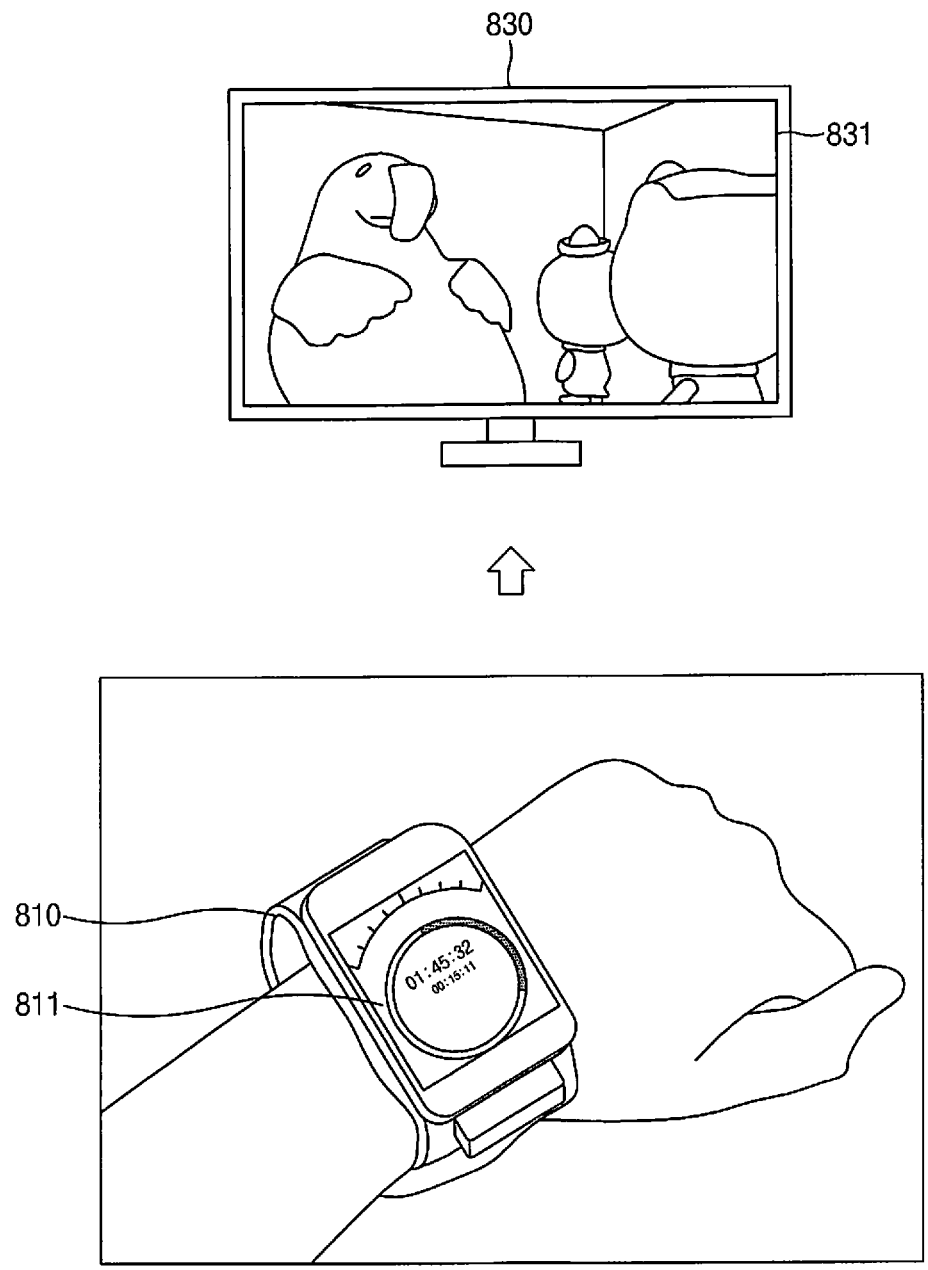
FIG. 8 illustrates a search of content executed in an external electronic device according to an embodiment of the present disclosure.

FIG. 8 illustrates a search of content executed in an external electronic device according to an embodiment of the present disclosure.

Referring to FIG. 8, an electronic device 810 may control a screen 831 of executing content executed in an external electronic device 830. The electronic device 810 outputs a content search controller 811 on its screen and may search for the content executed in the external electronic device 830 through the content search controller 811. The electronic device 810 may analyze a user input on the content search controller 811 and may send a control signal for the content to the external electronic device 830 based on the analyzed result. Alternatively, the electronic device 810 may send the analyzed result to the external electronic device 830. The external electronic device 830 may control the content based on the analyzed result.

For example, if a media file is being reproduced through a table PC or a smart TV, the above-mentioned embodiment may be suitable if a wearable electronic device such as a wearing smart watch controls the media file. The wearable electronic device such as the smart watch may output the content search controller 811 on its screen and may control, for example, may search for a media file reproduced on the external electronic device 830, such as a tablet PC or a smart TV, through the content search controller 811.

Figure 9:
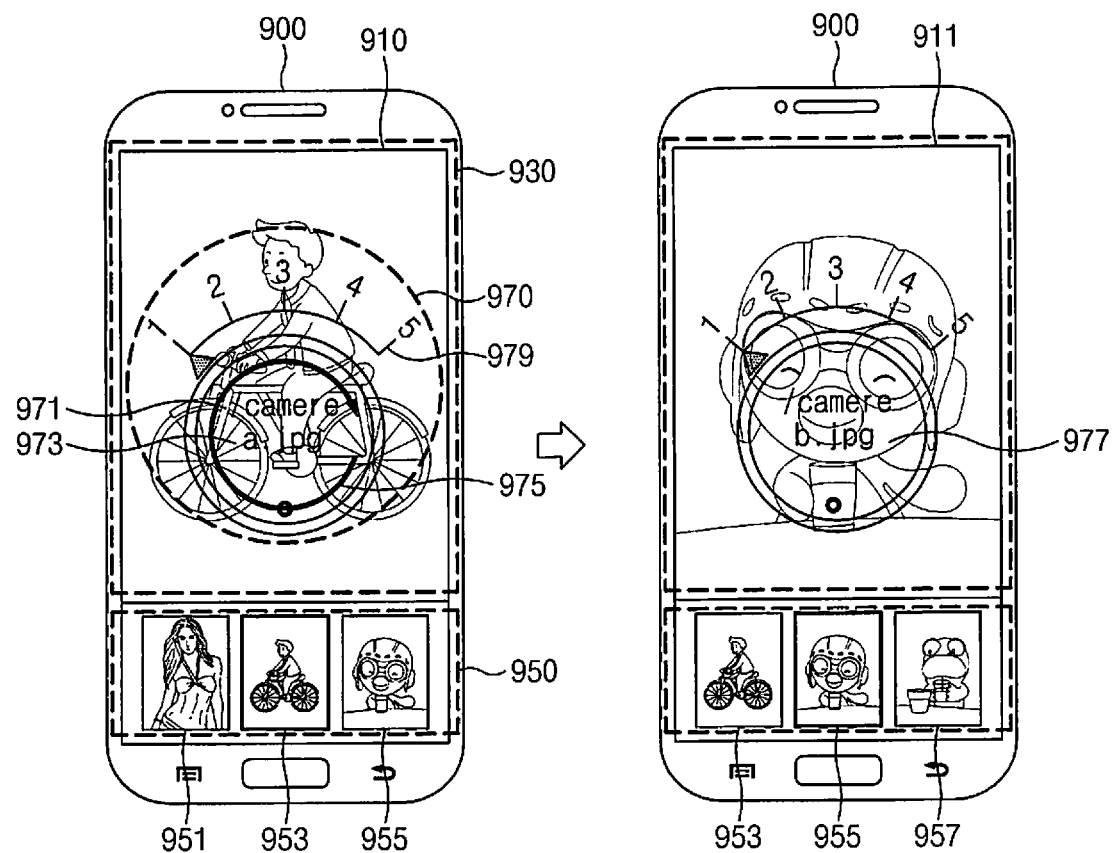
FIG. 9 illustrates screens providing a content search interface of a file search application according to an embodiment of the present disclosure.

FIG. 9 illustrates screens for providing a content search interface of a file search application according to an embodiment of the present disclosure.

Referring to FIG. 9, an electronic device 900 outputs a screen 910 for executing the file search application. For example, the electronic device 900 may output a screen of searching for at least one file included in a specified directory in response to a request to execute a file explorer.

The screen 910 includes a selected file execution region 930 and a file search region 950. The selected file execution region 930 may be a region of executing a currently selected file and may be configured on a region of the screen 910. The file search region 950 may be a region of displaying information associated with at least one file included in the specified directory, and may display at least one file name and the like included in the directory in the form of a list or, as illustrated in FIG. 9, may display thumbnail images of files in order. For example, the file search region 950 in screen 910 includes a thumbnail image 951 of a first file, a thumbnail image 953 of a second file, and a thumbnail image 955 of a third file.

FIG. 9 illustrates the electronic device 900 outputting a screen 910 for executing the second file on the selected file execution region 930 after the second file is selected and outputs a deep periphery of the thumbnail image 953 of the second file to be distinguished from other images.

If a specified user input occurs on the selected file execution region 930, the electronic device 900 may output the content search controller 970 on a region. For example, the electronic device 900 may output the content search controller 970, including a search location selection object including search target related information 971 or search unit related information 973, a search unit setting object 979 arranged to be adjacent to the search location selection object, on a region of the selected file execution region 930. In this case, the search target related information 971 may include a specified directory name, and the search unit related information 973 may include a currently selected file name. In the search unit setting object 979, the number of files may be designated as a search unit.

If receiving a specified user input 975 on the search location selection object, the electronic device 900 may analyze the user input 975 and may search for a file based on the analyzed result. FIG. 9 illustrates the electronic device 900 executing a subsequent file on the selected file execution region 930 after the user input 975 set to execute the subsequent file occurs. For example, if the subsequent file is the third file, the electronic device 900 may output a screen of executing the third file on the selected file execution region 930.

In screen 911, the electronic device 900 may output the thumbnail image 955 of the third file on a central region of the file search region 950 and may output the thumbnail image 953 of the previously executed second file and a thumbnail image 957 of a subsequent fourth file on regions adjacent to both sides of the thumbnail image 955 of the third file. The electronic device 900 may restore the periphery of the thumbnail image 953 of the previously executed second file to an original state and may output a deep periphery of the thumbnail image 955 of the third file.

Also, the electronic device 900 may replace the search unit related information 973 including a file name (e.g., "a.jpg") of the second file with search unit related information 977 including a file name (e.g., "b.jpg") of the third file, as shown in screen 911.

Figure 10:
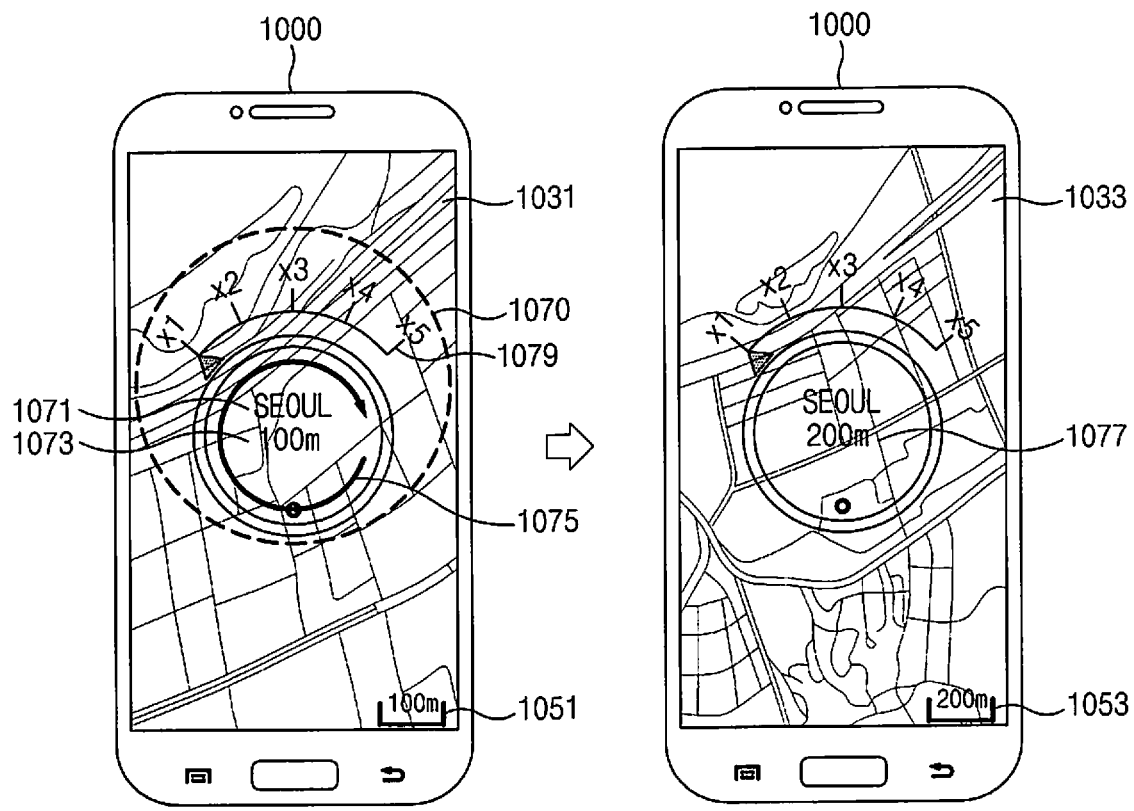
FIG. 10 illustrates screens providing a content search interface of a location search application according to an embodiment of the present disclosure.

FIG. 10 illustrates screens for providing a content search interface of a location search application according to an embodiment of the present disclosure.

Referring to FIG. 10, an electronic device 1000 outputs a screen for executing the location search application. For example, the location search application may include a map application.

FIG. 10 illustrates a first map screen 1031 set to a first scale 1051.

If a specified user input occurs on the map screen, the electronic device 1000 may output a content search controller 1070 on its region. For example, the electronic device 1000 may output the content search controller 1070, including a search location selection object including search target related information 1071 or search unit related information 1073, and a search unit setting object 1079 arranged to be adjacent to the selection location selection object, on a region of the map screen. The search target related information 1071 may include a place name (e.g., a city name) indicated by a map, and the search unit related information 1073 may include a currently selected scale. In the search unit setting object 1079, magnification information may be designated as a search unit.

If receiving a specified user input 1075 on the search location selection object, the electronic device 1000 may analyze the user input 1075 and may search for the map based on the analyzed result.

FIG. 10 illustrates a screen where a second map screen 1033 set to a second scale 1053 obtained by multiplying the first scale by a set magnification is newly applied. Therefore, the electronic device 1000 may replace the search unit related information 1073 including the first scale 1051 with search unit related information 1077 including the second scale 1053.

Figure 11:
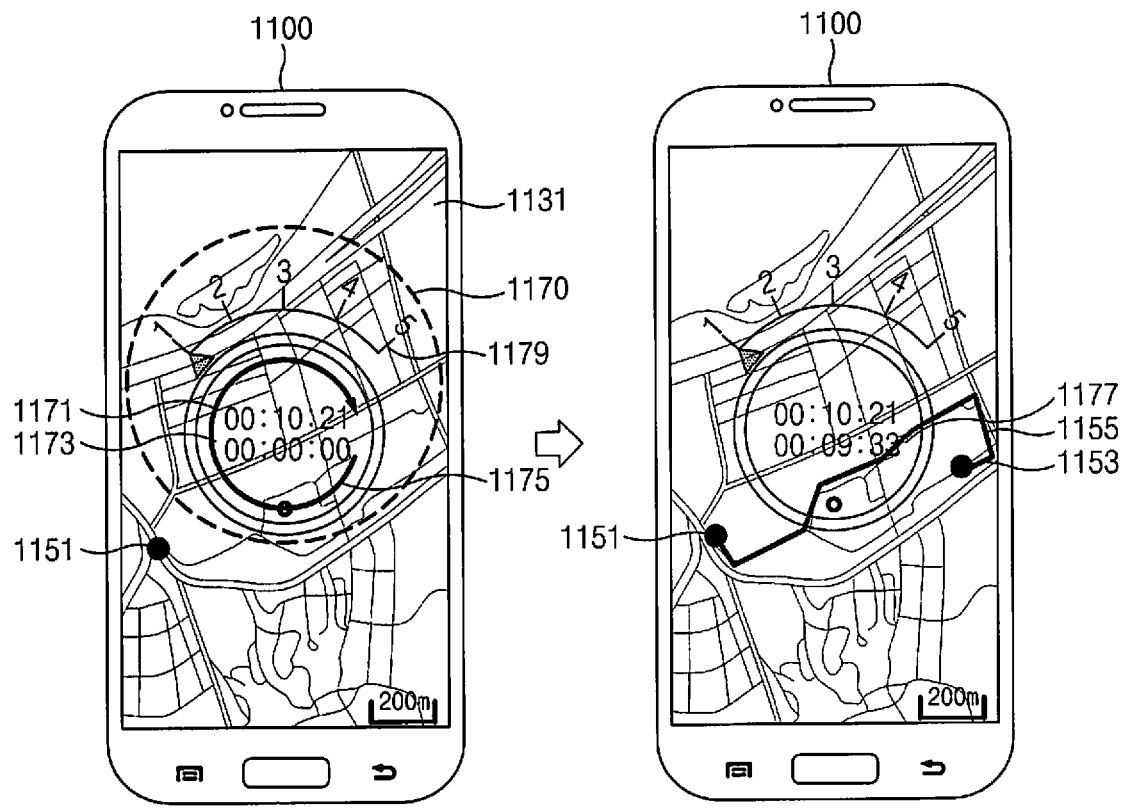
FIG. 11 illustrates screens providing a content search interface of a location tracking application according to an embodiment of the present disclosure.

FIG. 11 illustrates screens for providing a content search interface of a location tracking application according to an embodiment of the present disclosure.

Referring to FIG. 11, an electronic device 1100 may output a screen for executing the location tracking application, which may display location information based on history information, in response to a request to execute the location information including the history information. When executing an exercise application or a health management application that outputs exercise information including history information as well as location information or health information, the electronic device 1100 may perform the exercise application or the health management application to be the same or similar to the location tracking application.

The screen for executing the location tracking application may include a map screen 1131 set to a specified scale. Also, the electronic device 1100 may display a point 1151 indicating an initial time point of the history information on the map screen 1131.

If a specified user input occurs on the map screen 1131, the electronic device 1100 may output a content search controller 1170 on its region. For example, the electronic device 1100 may output the content search controller 1170, including a search location selection object including search target related information 1171 or search unit related information 1173, and a search unit setting object 1179 arranged to be adjacent to the search location selection object, on a region of the map screen 1131. The search target related information 1171 may include total recording time information included in the history information, and the search unit related information 1173 may include time information corresponding to currently displayed (or selected) history information. In the search unit setting object 1179, a time may be designated as a search unit.

If receiving a specified user input 1175 on the search location selection object, the electronic device 1100 may analyze the user input 1175 and may track a location based on the analyzed result.

FIG. 11 illustrates paths 1155 from the point 1151 indicating the initial time point of the history information to a point 1153 indicating a selection time point of the history information are connected in order based on corresponding location information. The electronic device 1100 may replace the search unit related information 1173 including to time information indicating the initial time point of the history information with search unit related information 1177 including time information indicating the selection time point of the history information. The electronic device 1100 may sequentially change time information from the time information indicating the initial time point of the history information to the time information indicating the selection time point of the history information and may output the changed time information.

Figure 12:
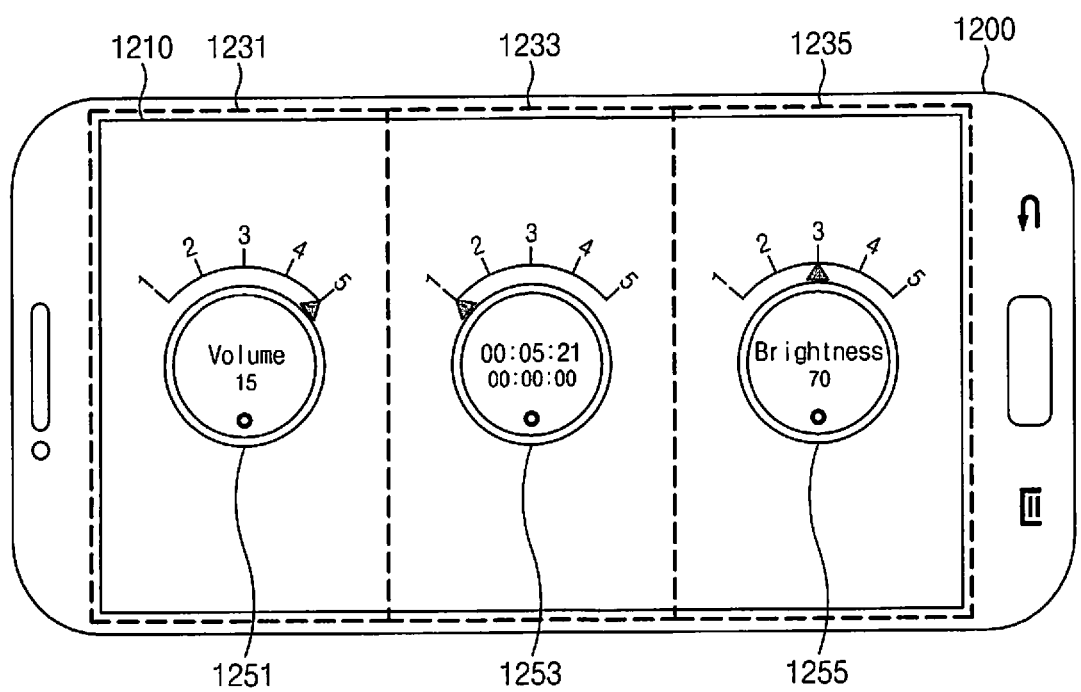
FIG. 12 illustrates a search unit based on an occurrence location of a user input according to an embodiment of the present disclosure.

FIG. 12 illustrates a search unit based on an occurrence location of a user input according to an embodiment of the present disclosure.

Referring to FIG. 12, an electronic device 1200 may output a search controller of a target to be searched for in different ways, based on the location of a user input. For example, if a specified user input occurs on a content execution screen 1210, the electronic device 1200 may output the search controller on its region. The electronic device 1200 may analyze the user input and may specify a search unit in a different way based on the analyzed result. For example, the electronic device 1200 may analyze an occurrence location of the user input and may specify the search unit in a different way based on the occurrence location.

If the search target is a media file, the electronic device 1200 may set the search unit to the number of frames, a time, a playback volume level, or a screen brightness level, and the like.

FIG. 12 illustrates the content execution screen 1210, divided into three equal regions by the electronic device 1200, in which a search unit is set to a time, a playback volume level, or a screen brightness level to correspond to a specified user input if the specified user input occurs for each region. For example, if a specified user input occurs on a first region 1231, the electronic device 1200 may output a playback volume level search controller 1251, a search unit of which is set to a playback volume level. If the user input occurs on a second region 1233, the electronic device 1200 may output a media file search controller 1253, a search unit of which is set to a time. If the user input occurs on a third region 1235, the electronic device 1200 may output a screen brightness level search controller 1255, a search unit of which is set to a screen brightness level.

The electronic device may set the search unit when searching for content by providing the content search interface, including the search unit setting object, which is substantially a circle and may not limit a movement range of a gesture input by setting a search function to correspond to a circular gesture input.

As described above, according to various embodiments, a method for providing a content search interface in an electronic device may include analyzing a first user input which occurs on a screen of executing content, analyzing the content, generating a search controller based on at least one of the result of analyzing the first user input or the result of analyzing the content, if there is no search controller for the content, and activating or outputting the search controller.

According to various embodiments, the generating of the search controller may include generating the search controller as a graphic user interface (GUI) indicating a starting point of the content, an ending point of the content, and a point of playback of the content, the starting point and the ending point being overlapped and adjacent to each other and the point of playback being displayed on a path formed between the starting point and the ending point.

According to various embodiments, the activating or outputting of the search controller may further include changing or setting an output location of the search controller to correspond to an occurrence location of the first user input.

According to various embodiments, the generating of the search controller may include setting a search unit of the search controller in a different way based on an occurrence location of the first user input.

According to various embodiments, the method may further include analyzing a second user input on the search controller, and setting a search unit for the content or searching for the content, based on at least part of the result of analyzing the second user input.

According to various embodiments, the setting of the search unit for the content may further include outputting a display object of guiding to set the search unit in response to the second user input, and setting a setting value corresponding to one point of the display object as the search unit based on at least part of a result of analyzing a third user input for selecting the one point of the display object.

According to various embodiments, the searching for of the content may include sequentially executing the content to have a search interval based on the search unit.

Figure 13:
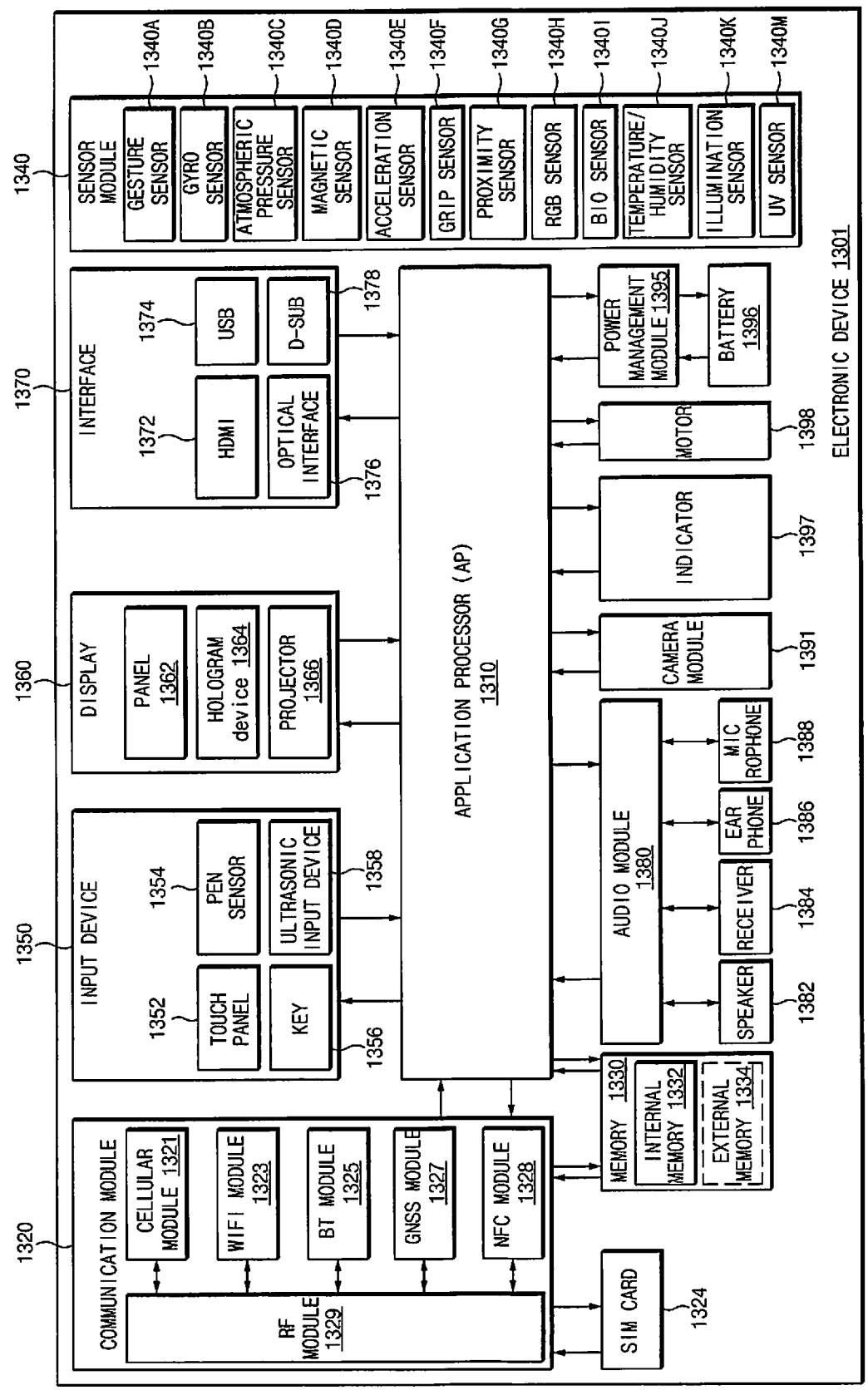
FIG. 13 illustrates an electronic device according to an embodiment of the present disclosure of the present disclosure.

FIG. 13 illustrates an electronic device according to an embodiment of the present disclosure.

Referring to FIG. 13, the electronic device 1301 includes at least one processor (e.g., AP) 1310, a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may run an OS or an application program so as to control a plurality of hardware or software elements connected to the processor 1310, and may process various data and perform operations. The processor 1310 may be implemented with, for example, a system on chip (SoC). The processor 1310 may further include a graphic processing unit (GPU) and/or an image signal processor. The processor 1310 may include at least a portion (e.g., a cellular module 1321) of the elements illustrated in FIG. 13. The processor 1310 may load, on a volatile memory, an instruction or data received from at least one of other elements (e.g., a nonvolatile memory) to process the instruction or data, and may store various data in a nonvolatile memory.

The communication module 1320 may have a configuration that is the same as or similar to that of the communication interface 170 of FIG. 1. The communication module 1320 includes a cellular module 1321, a Wi-Fi module 1323, a Bluetooth (BT) module 1325, a GNSS module 1327 (e.g., a GPS module, a GLONASS module, a Beidou module, or a Galileo module), a NFC module 1328, and a radio frequency (RF) module 1329.

The cellular module 1321 may provide, for example, a voice call service, a video call service, a text message service, or an Internet service through a communication network. The cellular module 1321 may identify and authenticate the electronic device 1301 in the communication network using the subscriber identification module 1324 (e.g., a SIM card). The cellular module 1321 may perform at least a part of functions that may be provided by the processor 1310. The cellular module 1321 may include a communication processor (CP).

Each of the Wi-Fi module 1323, the Bluetooth module 1325, the GNSS module 1327 and the NFC module 1328 may include, for example, a processor for processing data transmitted/received through the modules. At least a part (e.g., two or more) of the cellular module 1321, the Wi-Fi module 1323, the Bluetooth module 1325, the GNSS module 1327, and the NFC module 1328 may be included in a single integrated chip (IC) or IC package.

The RF module 1329 may transmit/receive, for example, communication signals (e.g., RF signals). The RF module 1329 may include, for example, a transceiver, a power amp module (PAM), a frequency filter, a low noise amplifier (LNA), an antenna, or the like. At least one of the cellular module 1321, the Wi-Fi module 1323, the Bluetooth module 1325, the GNSS module 1327, or the NFC module 1328 may transmit/receive RF signals through a separate RF module.

The SIM 1324 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1330 includes an internal memory 1332 or an external memory 1334. The internal memory 1332 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.)), a hard drive, or a solid state drive (SSD).

The external memory 1334 may include a flash drive such as a compact flash (CF), a secure digital (SD), a Micro-SD, a Mini-SD, an extreme digital (xD), a MultiMediaCard (MMC), a memory stick, etc. The external memory 1334 may be operatively and/or physically connected to the electronic device 1301 through various interfaces.

The sensor module 1340 may measure physical quantity or detect an operation state of the electronic device 1301 so as to convert measured or detected information into an electrical signal. The sensor module 1340 includes a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., a red/green/blue (RGB) sensor), a biometric sensor 1340I, a temperature/humidity sensor 1340J, an illumination sensor 1340K, and an ultraviolet (UV) sensor 1340M. Additionally or alternatively, the sensor module 1340 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1340 may further include a control circuit for controlling at least one sensor included therein. The electronic device 1301 may further include a processor configured to control the sensor module 1340 as a part of the processor 1310 or separately, so that the sensor module 1340 is controlled while the processor 1310 is in a sleep state.

The input device 1350 includes a touch panel 1352, a (digital) pen sensor 1354, a key 1356, and an ultrasonic input device 1358. The touch panel 1352 may employ at least one of capacitive, resistive, infrared, and ultraviolet sensing methods. The touch panel 1352 may further include a control circuit. The touch panel 1352 may further include a tactile layer so as to provide a haptic feedback to a user.

The (digital) pen sensor 1354 may include, for example, a sheet for recognition which is a part of a touch panel or is separate.

The key 1356 may include, for example, a physical button, an optical button, or a keypad.

The ultrasonic input device 1358 may sense ultrasonic waves generated by an input tool through a microphone 1388 so as to identify data corresponding to the ultrasonic waves sensed.

The display 1360 includes a panel 1362, a hologram device 1364, and a projector 1366. The panel 1362 may be, for example, flexible, transparent, or wearable. The panel 1362 and the touch panel 1352 may be integrated into a single module.

The hologram device 1364 may display a stereoscopic image in a space using a light interference phenomenon.

The projector 1366 may project light onto a screen so as to display an image.

The screen may be disposed in the inside or the outside of the electronic device 1301.

The display 1360 may further include a control circuit for controlling the panel 1362, the hologram device 1364, or the projector 1366.

The interface 1370 includes an HDMI 1372, a USB 1374, an optical interface 1376, and a D-subminiature (D-sub) 1378. Additionally or alternatively, the interface 1370 may include, for example, a mobile high-definition link (MHL) interface, an SD card/multi-media card (MMC) interface, or an infrared data association (IrDA) interface.

The audio module 1380 may convert a sound into an electrical signal or vice versa. The audio module 1380 may process sound information input or output through a speaker 1382, a receiver 1384, an earphone 1386, and/or the microphone 1388.

The camera module 1391 shoots a still image or a video. The camera module 1391 may include at least one image sensor (e.g., a front sensor or a rear sensor), a lens, an image signal processor (ISP), or a flash (e.g., an LED or a xenon lamp).

The power management module 1395 may manage power of the electronic device 1301. The power management module 1395 may include a power management integrated circuit (PMIC), a charger integrated circuit (IC), and/or a battery gauge. The PMIC may employ a wired and/or wireless charging method.

The wireless charging method may include, for example, a magnetic resonance method, a magnetic induction method, an electromagnetic method, or the like. An additional circuit for wireless charging, such as a coil loop, a resonant circuit, a rectifier, etc., may be further included.

The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, or the like.

The motor 1398 may convert an electrical signal into a mechanical vibration, and may generate a vibration or haptic effect.

Although not illustrated, a processing device (e.g., a GPU) for supporting a mobile TV may be included in the electronic device 1301. The processing device for supporting a mobile TV may process media data according to the standards of digital multimedia broadcasting (DMB), digital video broadcasting (DVB), MediaFLO™, etc.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Further, some of the elements of the electronic device may be combined with each other so as to form one entity, so that the functions of the elements may be performed in the same manner as before the combination.

Figure 14:
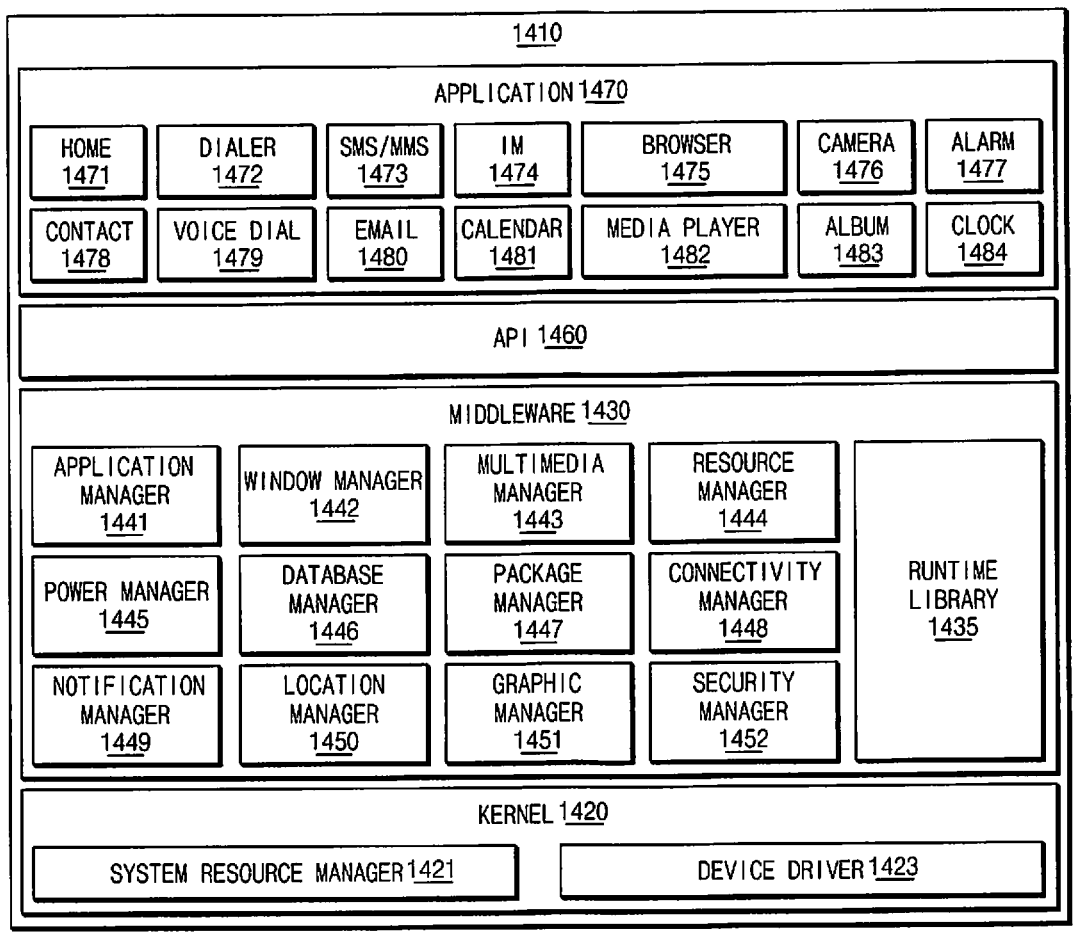
FIG. 14 illustrates a program module according to an embodiment of the present disclosure.

FIG. 14 illustrates a program module according to an embodiment of the present disclosure.

Referring to FIG. 14, a program module 1410 may include an OS for controlling a resource related to an electronic device and/or various applications running on the OS. The operating system may be, for example, Android®, iOS®, Windows®, Symbian®, Tizen, etc.

The program module 1410 includes a kernel 1420, a middleware 1430, an API 1460, and applications 1470. At least a part of the program module 1410 may be preloaded on an electronic device or may be downloaded from an external electronic device.

The kernel 1420 includes a system resource manager 1421 and a device driver 1423.

The system resource manager 1421 may perform control, allocation, or retrieval of a system resource. The system resource manager 1421 may include a process management unit, a memory management unit, a file system management unit, etc. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430, for example, may provide a function that the applications 1470 require in common, or may provide various functions to the applications 1470 through the API 1460 so that the applications 1470 may efficiently use limited system resources in the electronic device. The middleware 1430 includes a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 may include, for example, a library module that a complier uses to add a new function through a programming language while the application 1470 is running. The runtime library 1435 may perform a function for input/output management, memory management, or an arithmetic function.

The application manager 1441 may mange a life cycle of at least one of the applications 1470.

The window manager 1442 may manage a GUI resource used in a screen.

The multimedia manager 1443 may recognize a format required for playing various media files and may encode or decode a media file using a codec matched to the format.

The resource manager 1444 may manage a resource such as a source code, a memory, or a storage space of at least one of the applications 1470.

The power manager 1445 may operate together with a basic input/output system (BIOS) to manage a battery or power and may provide power information required for operating the electronic device.

The database manager 1446 may generate, search, or modify a database to be used in at least one of the applications 1470.

The package manager 1447 may manage installation or update of an application distributed in a package file format.

The connectivity manger 1448 may manage wireless connection of Wi-Fi, Bluetooth, etc.

The notification manager 1449 may display or notify an event such as message arrival, appointments, and proximity alerts in such a manner as not to disturb a user.

The location manager 1450 may manage location information of the electronic device.

The graphic manager 1451 may manage a graphic effect to be provided to a user or a user interface related thereto.

The security manager 1452 may provide various security functions required for system security or user authentication.

When an electronic device includes a phone function, the middleware 1430 may further include a telephony manager for managing a voice or video call function of the electronic device.

The middleware 1430 may include a middleware module for forming a combination of various functions of the above-mentioned elements. The middleware 1430 may provide a module specialized for each type of an operating system to provide differentiated functions. Further, the middleware 1430 may delete a part of existing to elements or may add new elements dynamically.

The API 1460 which is, for example, a set of API programming functions may be provided in different configurations according to an operating system. For example, in the case of Android® or iOS®, one API set may be provided for each platform, and, in the case of Tizen, at least two API sets may be provided for each platform.

The applications 1470 include a home application 1471, a dialer application 1472, an SMS/MMS application 1473, an instant message (IM) application 1474, a browser application 1475, a camera application 1476, an alarm application 1477, a contact application 1478, a voice dial application 1479, an e-mail application 1480, a calendar application 1481, a media player application 1482, an album application 1483, and a clock application 1484. Additionally or alternatively, the applications 1470 may include a health care application (e.g., measure an exercise amount or blood sugar), or an environmental information provision application (e.g., provide air pressure, humidity, or temperature information).

The applications 1470 may include an information exchange application for supporting information exchange between the electronic device and an external electronic device. The information exchange application may include, for example, a notification relay application for relaying specific information to the external electronic device or a device management application for managing the external electronic device.

For example, the notification relay application may have a function for relaying, to an external electronic device, notification information generated in another application (e.g., the SMS/MMS application 1473, the e-mail application 1480, a health care application, an environmental information application, etc.) of the electronic device. Further, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application running in the external electronic device, or a service (e.g., a call service, a message service, etc.) provided from the external electronic device.

The applications 1470 may include a specified application (e.g., a healthcare application of a mobile medical device) according to an attribute of the external electronic device. The application 1470 may include an application received from an external electronic device. The application 1470 may include a preloaded application or a third-party application downloadable from a server. The names of the elements of the program module 1410 illustrated may vary with the type of an operating system.

At least a part of the program module 1410 may be implemented with software, firmware, hardware, or a combination thereof. At least a part of the program module 1410, for example, may be implemented (e.g., executed) by a processor (e.g., the processor 1310). At least a part of the program module 1410 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, a memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
    a touch screen display;
    a processor; and
    a memory configured to store audio/video data comprising a starting point and an ending point, and instructions, which, when executed, instruct the processor to:
        play the audio/video data;
        display, on the touch screen display, a first graphic user interface (GUI) comprising a first object indicating the starting point, a second object indicating the ending point, and a third object indicating a point of playback, wherein the first object and the second object are adjacent to each other or overlapped with each other and the third object is displayed on a curved path connecting the first object and the second object;
        receive, through the touch screen display, a first gesture input on the first GUI;
        in response to receiving the first gesture input, move the third object on the curved path;
        receive, through the touch screen display, a second gesture input;
        in response to receiving the second gesture input, display a second GUI forming an angle within a selected range on the curved path, wherein the second GUI comprises a plurality of discrete labels representing different speeds or rates at which the third object moves on the curved path;
        receive, through the touch screen display, a third gesture input on the second GUI while the audio/video data is played; and
        in response to receiving the third gesture input, change a speed or rate at which the third object moves on the curved path.

2. The electronic device of claim 1, wherein the curved path is circular or elliptical.

3. The electronic device of claim 1, wherein the first object contacts the second object, the curved path forms a closed loop, and the first object is separated from the second object by a predetermined distance through which the curved path does not pass.

4. The electronic device of claim 1, wherein the first gesture input has a same or similar form to at least part of the curved path.

5. The electronic device of claim 1, wherein the memory is further configured to store instructions, which, when executed, further instruct the processor to:
    based on a setting value indicated by an indicator which is moved by the third gesture input, change the speed or the rate at which the third object moves on the curved path.

6. The electronic device of claim 1, wherein the first GUI further comprises a fourth object indicating a relative time, in which the audio/video data is playing from the first object to the third object, with respect to an entire playback time of the audio/video data along the curved path.

7. An electronic device, comprising:
    a touch screen display;
    a processor; and
    a memory configured to store content and instructions, which, when executed, instruct the processor to:
        execute the content;
        display, on the touch screen display, a first graphic user interface (GUI) comprising a first object indicating a starting point of the content, a second object indicating an ending point of the content, and a third object indicating a point of playback of the content, wherein the first object and the second object are adjacent to each other or overlapped with each other and the third object is displayed on a curved path connecting the first object and the second object;
        receive, through the touch screen display, a first gesture input;
        in response to receiving the first gesture input, move the third object on the curved path;
        receive, through the touch screen display, a second gesture input;
        in response to receiving the second gesture input, display a second GUI forming an angle within a selected range on the curved path, wherein the second GUI comprises a plurality of discrete labels representing different speeds or rates at which the third object moves on the curved path;
        receive, through the touch screen display, a third gesture input on the second GUI while the content is executed; and
        in response to receiving the third gesture input, change a search unit of the content.

8. The electronic device of claim 7, wherein the curved path is circular or elliptical.

9. The electronic device of claim 7, wherein the first object contacts the second object, the curved path forms a closed loop, and the first object is separated from the second object by a predetermined distance through which the curved path does not pass.

10. The electronic device of claim 7, wherein the first gesture input has a same or similar form to at least part of the curved path.

11. The electronic device of claim 7, wherein the memory is further configured to store instructions, which, when executed, further instruct the processor to:
    based on a setting value indicated by an indicator which is moved by the third gesture input, change the speed or the rate at which the third object moves on the curved path.

12. The electronic device of claim 7, wherein the memory is further configured to store instructions, which, when executed, further instruct the processor to sequentially execute the content to have a search interval based on the search unit of the content.

13. The electronic device of claim 7, wherein the content comprises at least one of text, an image, an icon, a photo, an audio, a video, and a directory including file information.

14. A method for providing a content search interface in an electronic device, the method comprising:
    executing content on a screen;
    displaying a first graphic user interface (GUI) comprising a first object indicating a starting point of the content, a second object indicating an ending point of the content, and a third object indicating a point of playback of the content, wherein the first object and the second object are adjacent to each other or overlapped with each other and the third object is displayed on a curved path connecting the first object and the second object;

in response to receiving a first user input on the first GUI, moving the third object on the curved path;

in response to receiving a second user input, displaying a second GUI forming an angle within a selected range on the curved path, wherein the second GUI comprises a plurality of discrete labels representing different speeds or rates at which the third object moves on the curved path; and in response to receiving a third gesture input on the second GUI while the content is executed, changing a speed at which the third object moves on the curved path.

15. The method of claim 14, wherein changing the speed comprises:

based on a setting value indicated by an indicator which is moved by the third gesture input, changing the speed or rate at which the third object moves on the curved path.

16. The method of claim 14, wherein the curved path is circular or elliptical.

17. The method of claim 14, wherein the first object contacts the second object, the curved path forms a closed loop, and the first object is separated from the second object by a predetermined distance through which the curved path does not pass.

18. The method of claim 14, wherein the first user input has a same or similar form to at least part of the curved path.

19. The method of claim 14, wherein moving the third object on the curved path comprises:

moving the third object based on an angle formed by the first user input on the curved path.

20. The method of claim 14, wherein the first GUI further comprises a fourth object indicating a relative time, in which the content is executing from the first object to the third object, with respect to an entire playback time of the content along the curved path.

* * * * *